INVENTOR.
Sidney T. Carter

Dec. 22, 1970     S. T. CARTER     3,549,457
GRIP-FINGER FOR LABELING MACHINE

Filed Sept. 20, 1965     17 Sheets-Sheet 3

INVENTOR.
Sidney T. Carter
BY
ATTORNEYS

Dec. 22, 1970  S. T. CARTER  3,549,457
GRIP-FINGER FOR LABELING MACHINE
Filed Sept. 20, 1965  17 Sheets-Sheet 4

INVENTOR
Sidney T. Carter
BY
ATTORNEYS

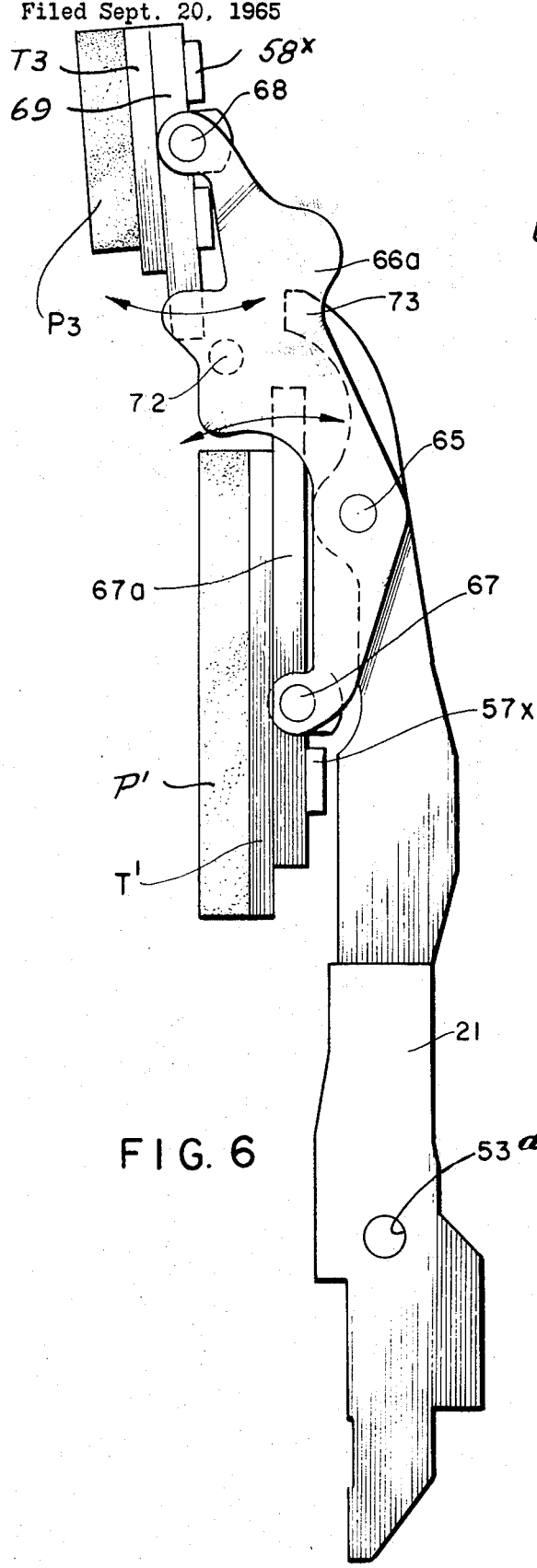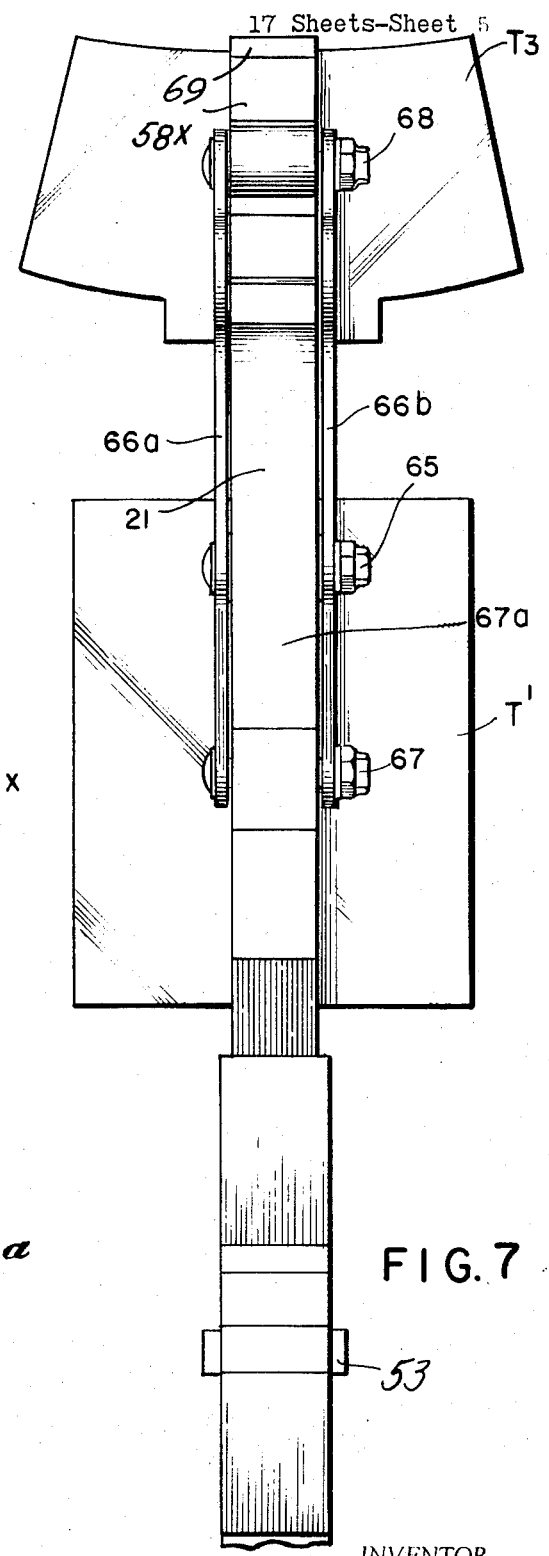

Dec. 22, 1970        S. T. CARTER        3,549,457
GRIP-FINGER FOR LABELING MACHINE
Filed Sept. 20, 1965                                     17 Sheets-Sheet 6

INVENTOR.
Sidney T. Carter
BY
ATTORNEYS

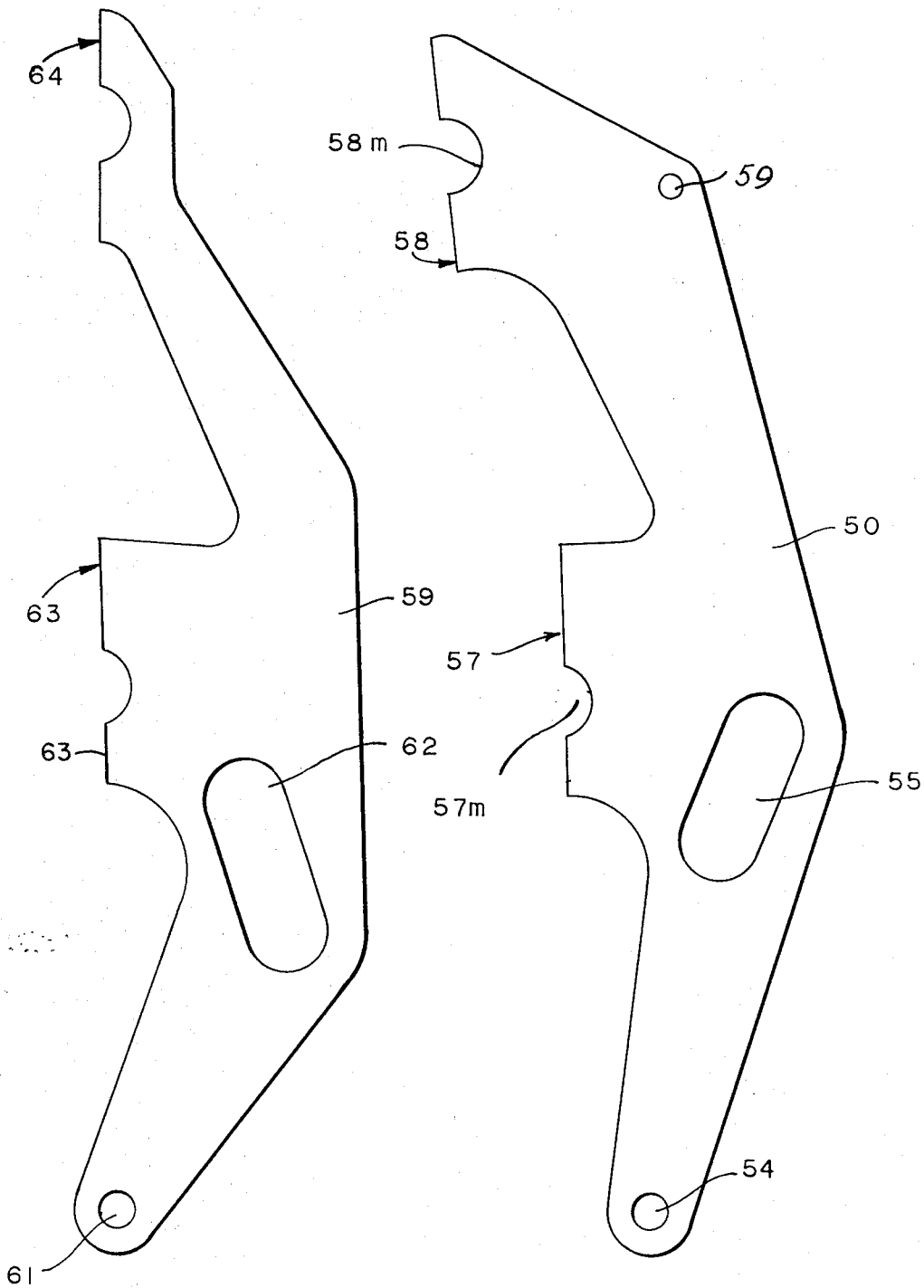

Dec. 22, 1970    S. T. CARTER    3,549,457
GRIP-FINGER FOR LABELING MACHINE
Filed Sept. 20, 1965    17 Sheets-Sheet 8

INVENTOR.
Sidney T. Carter
BY
Roberts Cushman & Corow
ATTORNEYS

Dec. 22, 1970                      S. T. CARTER                    3,549,457
                        GRIP-FINGER FOR LABELING MACHINE
Filed Sept. 20, 1965                                    17 Sheets-Sheet 9

INVENTOR
*Sidney T. Carter*
BY
*Roberts Cushman & Grover*

ATTORNEYS

Dec. 22, 1970  S. T. CARTER  3,549,457
GRIP-FINGER FOR LABELING MACHINE
Filed Sept. 20, 1965  17 Sheets-Sheet 10

INVENTOR.
Sidney T. Carter
BY
ATTORNEYS

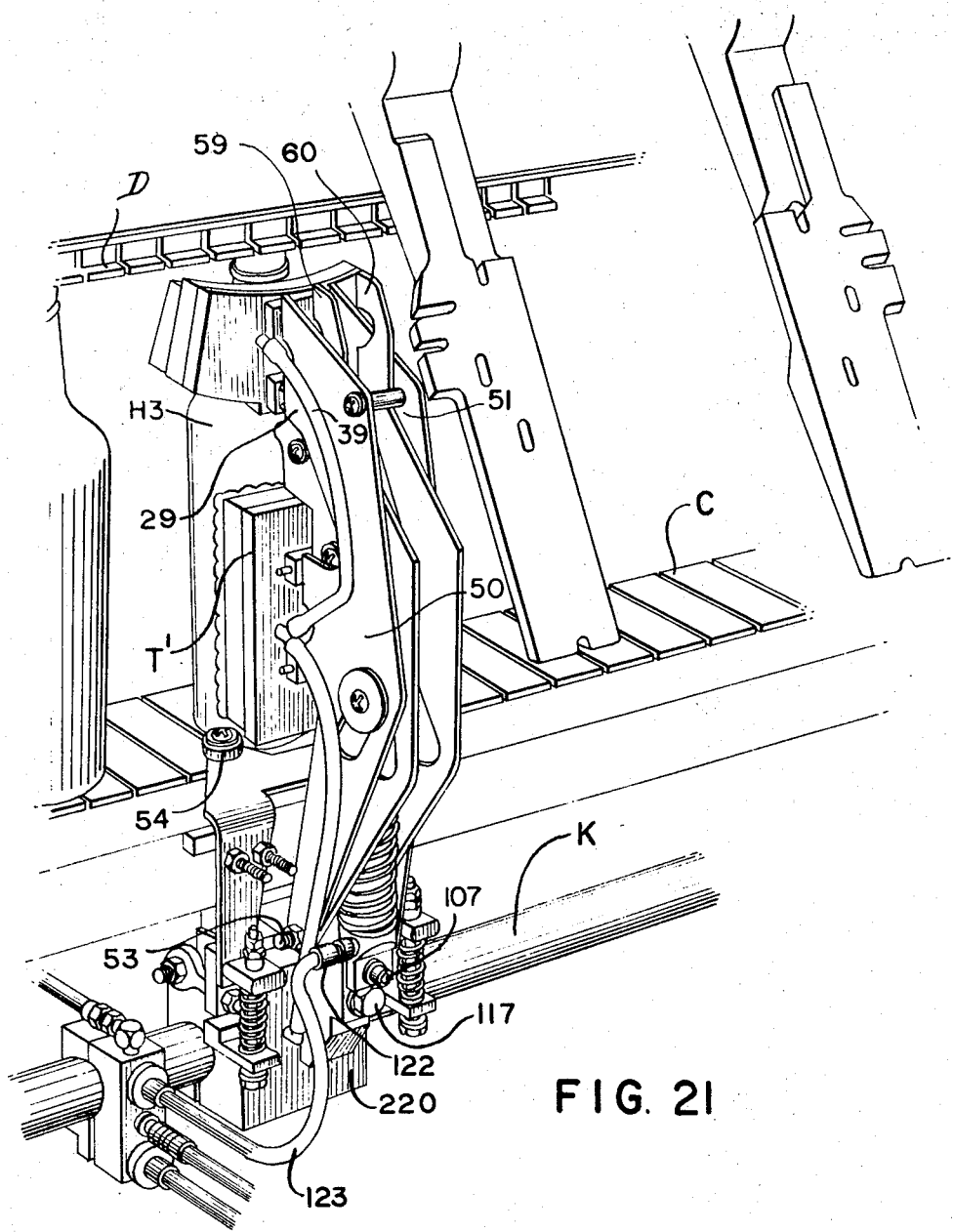

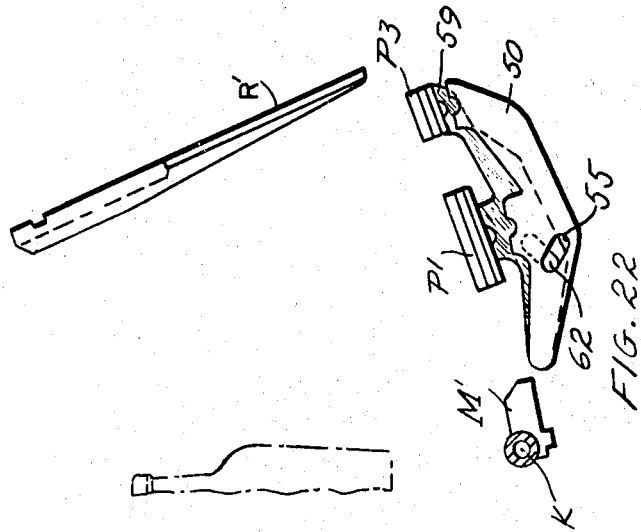
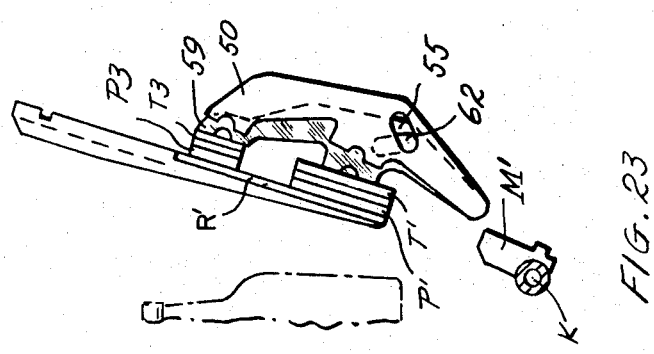
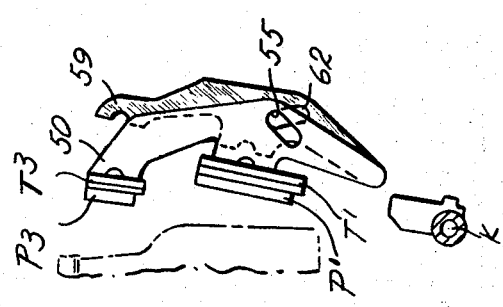
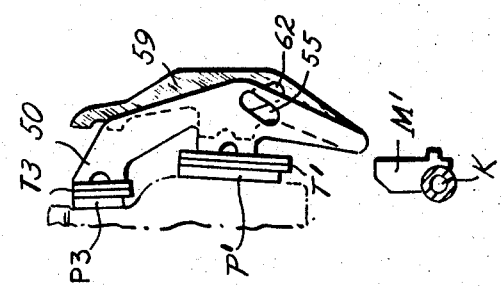

Dec. 22, 1970  S. T. CARTER  3,549,457
GRIP-FINGER FOR LABELING MACHINE
Filed Sept. 20, 1965  17 Sheets-Sheet 16

INVENTOR.
Sidney T. Carter
BY

ATTORNEY

United States Patent Office 3,549,457
Patented Dec. 22, 1970

3,549,457
GRIP-FINGER FOR LABELING MACHINE
Sidney T. Carter, Shrewsbury, Mass., assignor to Geo. J. Meyer Manufacturing Co., Cudahy, Wis., a corporation of Wisconsin
Filed Sept. 20, 1965, Ser. No. 488,366
Int. Cl. B65c 3/08, 3/18, 9/06
U.S. Cl. 156—476                                     19 Claims

ABSTRACT OF THE DISCLOSURE

A grip-finger assembly useful in a labeling machine of the kind wherein an article to be labeled is moving along a predetermined path while receiving the label and wherein the grip-finger assembly comprises a suction pad which receives a gum-coated label from a separable-blade picker at a transfer station and carries it into affixing relation to the moving article, and wherein, to apply positive pressure to the label while it is in contact with the picker at the transfer station and also while it is in affixing relation to the moving article, a motor device is associated with and, as a whole, bodily accompanies the suction pad as the latter moves from the transfer station into affixing relation to the travelling article.

---

This invention pertains to labeling machines and more especially to a so-called "grip-finger assembly," that is to say, a device which is designed to take a label from a gum-coated picker and apply its gummed surface directly to the article, for example a bottle, which is to be labeled.

Grip-finger assemblies having this general purpose are disclosed by way of example, in the patents to Carter, No. 2,652,941, dated Sept. 22, 1959 and No. 2,980,278, dated Apr. 18, 1961.

In its more limited aspects, the grip-finger assembly of the present invention is designed for use in a labeling machine of the kind wherein the label is applied to the bottle while the latter is in motion along a predetermined path, unusually rectilinear, and, if desired, to apply body and shoulder labels simultaneously to the same bottle. It is further so designed that by the arrangement of similar grip-fingers at opposite sides of the conveyor path, labels may be applied to diametrically opposite sides of the bottle. Moreover, the grip-finger assembly of the present invention is capable of use in a machine of the kind wherein several label magazines are arranged at the same side of the conveyor path and picker devices remove labels simultaneously from the several magazines and carry them to corresponding transfer stations where grip-fingers take the labels from the respective pickers and apply them to bottles spaced apart along said path.

In the copending application for Letters Patent Ser. No. 233,241, filed by Sidney T. Carter on Oct. 26, 1962, since issued as Pat. No. 3,197,354, dated July 27, 1965, it is pointed out that in applying labels to the upper portions of tall bottles, by means of a grip-finger which rocks about an axis in a plane adjacent to the conveyor path, difficulty has been experienced in exerting sufficient pressure by means of the grip-finger pad to assure firm adhesion of the entire label to the bottle. In the apparatus described in said patent, provision is made for applying spring force directly to the upper or free end portion of the grip-finger assembly while the latter is in operative or label-applying position, but the means so provided is incapable of maintaining the pressure for a substantial period of time if the bottle is moving, the pressure being but momentary.

In copending application for Letters Patent Ser. No. 268,030, filed by Sidney T. Carter on Mar. 26, 1963, since issued as Pat. No. 3,202,564, dated Aug. 24, 1965, it is noted that, in machines wherein several bottles are labeled simultaneously, it has commonly been thought necessary to restrict the grip-finger pad to a lateral width less than that of the label in order to avoid the necessity of spreading the picker blades so widely apart that the blades of one picker would interfere with those of the next adjacent pickers, but in such an arrangement there can be no certainty that the gum will be uniformly spread over the label. To insure such uniform spreading of the gum, the machine of the last-named patent provides for the picker to dwell, with its blades still closed, on its way from the magazine to the transfer point and while it is so dwelling pressure is so applied to the label as the picker blades open that the gum is uniformly spread over the surface of the label before the latter is taken from the picker by the grip-finger, but this required dwell limits the speed of the apparatus.

The present invention has for an object the provision of a grip-finger assembly of the general type heretofore employed but which is of a relatively simple construction; which does not comprise expensive parts; which does not rely upon springs for obtaining the required affixing pressure which does not limit the speed of the apparatus; and which is useful in applying labels, even when the bottles are moving, without recourse to the use of rollers, fixed abutments, or the like, for engagement by the grip-finger to assure the desired pressure. A further object is to provide grip-fingers whereby it is made possible to construct a labeling machine such as to apply labels to a plurality of bottles, simultaneously, while they are advancing in spaced relation along a rectillinear path and in which each grip-finger, itself, first applies pressure to the entire area of the label (while the label is carried by the picker and while the picker blades are separating) thereby insuring uniform spreading of the gum, and then transfers the label to the affixing point and applies heavy pressure to the label while the bottle continues to advance, thereby insuring adhering contact of the label with the bottle; and yet without causing adjacent pickers to interfere with each other or limit the speed.

Other objects and advantages of the invention will be made manifest in the following more detailed description and by reference to the annexed drawings wherein:

FIG. 1 is a fragmentary elevation, transversely of a conventionally shown conveyor (the latter in vertical section) with grip-finger assemblies, according to the present invention, at opposite sides, respectively, of the conveyor, each assembly being shown as disposed in label-applying position, one assembly including pads for affixing body and neck labels, respectively, and the other assembly having a single pad designed to apply a body label only;

FIG. 6 is a larger scale, side elevation, showing the rigid support (comprised in the assembly of FIG. 4) for the body label and neck label pads, and the connections between the pads, but omitting other parts;

FIG. 7 is a rear elevation of the parts shown in FIG. 6;

FIG. 10 is a side elevation of a force-applying lever whereby the pressure pad is urged toward the picker at the transfer station;

FIG. 11 is a side elevation of a force-applying lever whereby the pressure pad is urged toward the article to be labeled at the affixing position;

FIG. 21 is a fragmentary perspective view showing one grip-finger assembly approximately in the label-affixing position and also an adjacent pair of picker blades;

FIGS. 22, 23, 24 and 25 are diagrammatic side elevations illustrative of successive positions of a grip-finger assembly relatively to a picker and to the article to be labeled;

Figure 26:
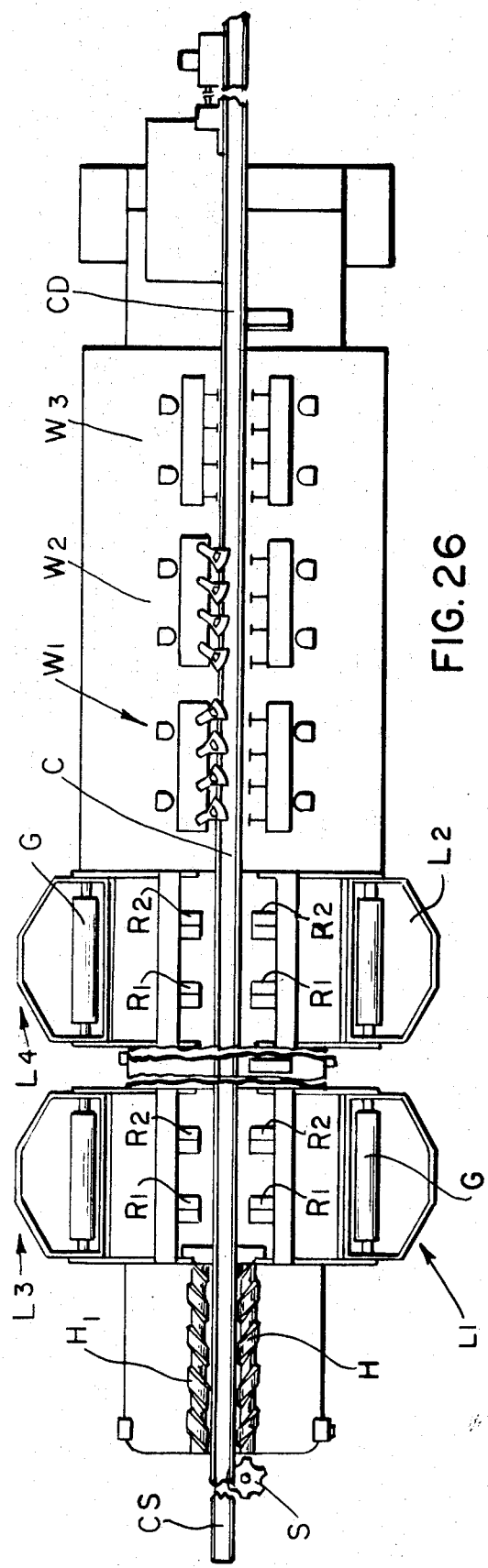
FIG. 26 is a small scale, diagrammatic plan view of a machine of a type wherein the grip-finger of the present invention is of special utility.
Figure 27:
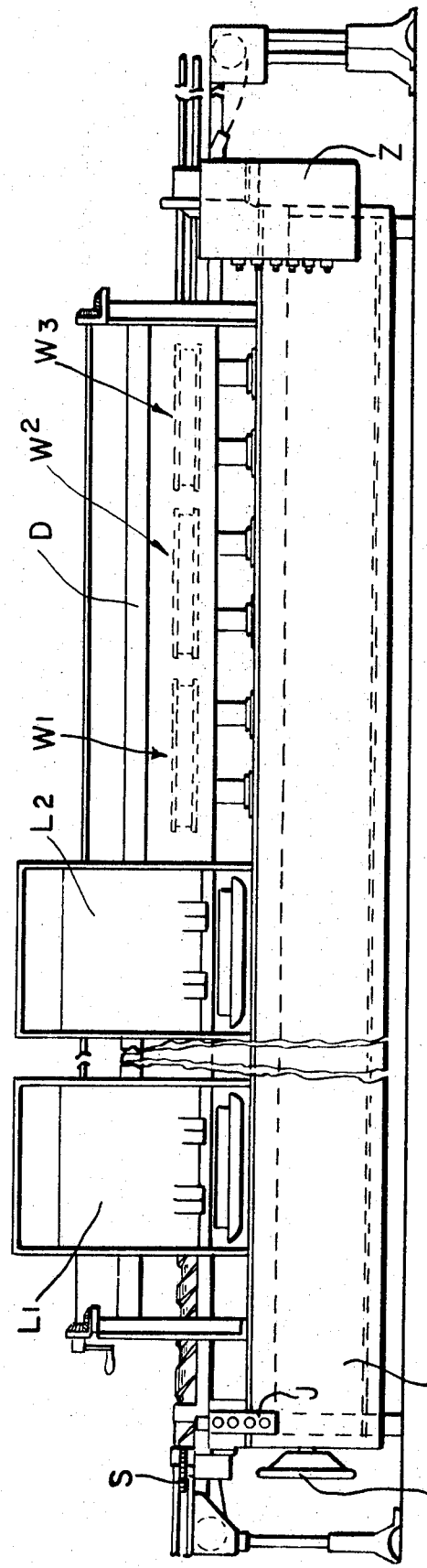
FIG. 27 is a front elevation of the machine of FIG. 26.
Figure 28:
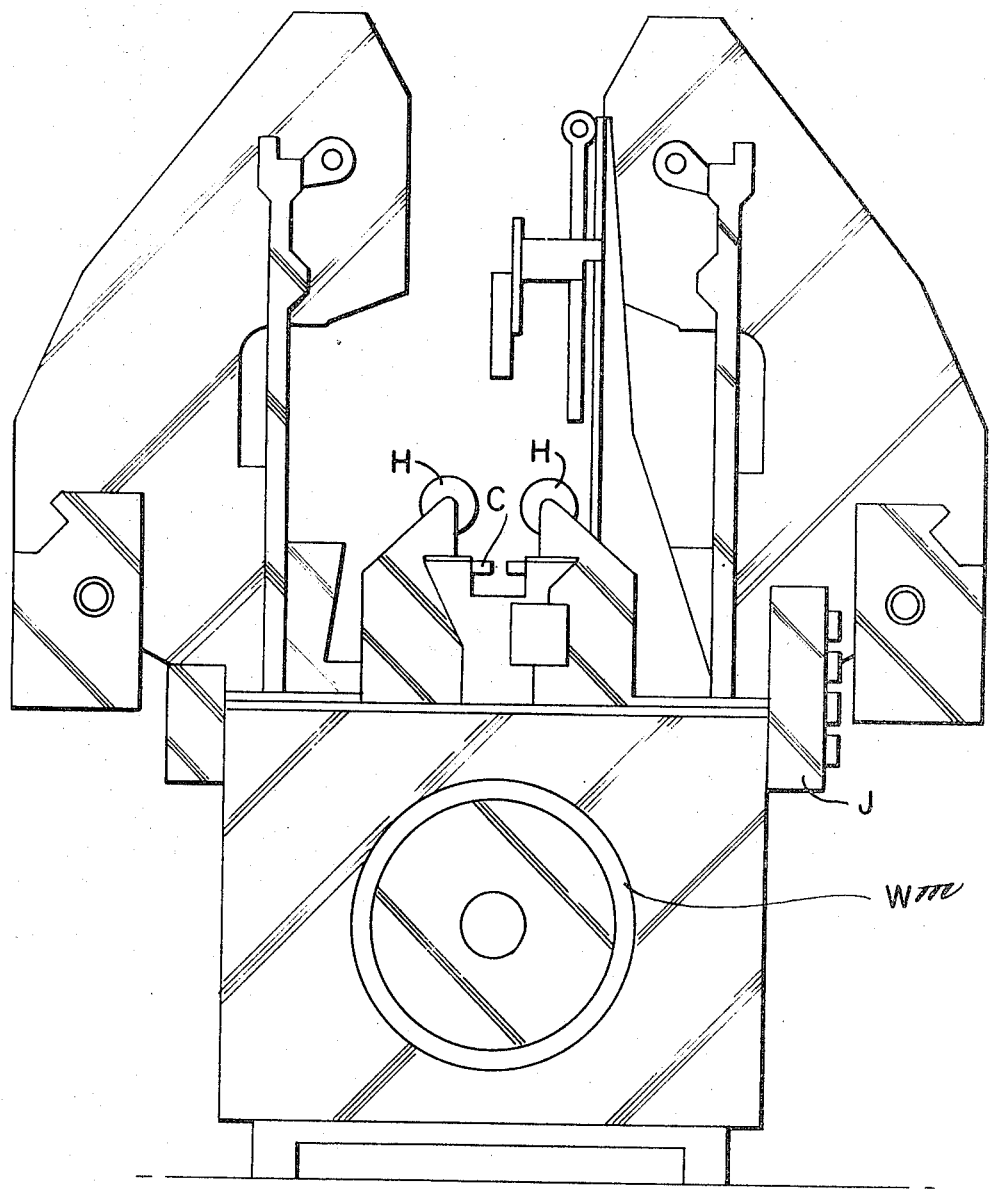
FIG. 28 is a diagrammatic end elevation (omitting parts) of the machine of FIGS. 26 and 27, but to larger scale.

Referring to the drawings, FIGS. 26 and 27 diagrammatically illustrate a labeling machine of a type wherein the improved grip-finger assembly of the present invention is of utility, the machine thus illustrated being of the general type of that disclosed in greater detail in the patent to Carter, No. 2,940,630, dated June 14, 1960. Thus, this machine comprises a suitable frame supporting a horizontal, substantially rectilinear and constantly moving conveyor C, including a supply portion CS and a delivery portion CD, with suitable guard rails, in accordance with customary practice, and wherein a star wheel S controls admission of articles to be labeled (hereinafter for convenience but without limitation, referred to as "bottles") to the opposed helices H. $H^1$ which advance the bottles into the field of action of label-applying units, two of which are here shown at each side, respectively, of the conveyor and indicated by the characters $L^1$, $L^2$, $L^3$ and $L^4$ respectively, each of these units comprising gum-supplying means including the usual gum roll G, and each unit, as here shown, comprising two picker devices $R^1$ and $R^2$ of the separable-blade type, the units $L^1$ and $L^2$ being so spaced and timed, for example, that the pickers $R^1$ and $R^2$ of the first unit $L^1$ will apply labels to alternate bottles as they move along the conveyor path while the pickers $R^1$ and $R^2$ of the second unit $L^2$ will apply labels to the intervening bottles. It is contemplated that the number of labeling units, and the number of pickers per unit, may be varied, as circumstances may direct.

Having received the labels, the bottles continue on along the conveyor path through the field of action of, for example, two sets of oscillatory brush wipers $W^1$ and $W^2$ and then through the field of action of pressure-type wipers $W^3$—the several wipers being so timed as to cooperate with bottles to which labels have been applied. Wipers of these types are more fully disclosed in the patents to Carter, Nos. 2,925,931 and 2,940,630. If preferred, all of the wipers may be of the same type, for instance pressure-type wipers.

As the articles advance along the conveyor path in leaving the helices H, $H^1$ the tops of the bottles are engaged by a hold-down device D (FIGS. 1, 21 and 27), for example, of the endless belt type, so that the bottles are prevented from tipping during the operation of applying the labels. Provision is made for raising or lowering the hold-down device D to accommodate bottles of different heights. Conveniently located control panels Z and J carry switches and other devices for the control of an electrical circuit (not here specifically described) whereby the various operations of the machine are carried out in orderly sequence.

Each of the grip-finger assemblies A and B (FIG. 1), according to the present invention, is mounted, respectively, upon an axially movable rock shaft K and $K^1$ (FIG. 1) corresponding, for example, to the rock shaft 207 shown in FIGS. 17, 21, 49 and 50 of the above patent, No. 2,940,630, and which is power-driven, for example, by connections of the kind described in said patent, from a motor driven main shaft, here shown (FIG. 27) as having at one end a hand wheel $Wm$ by means of which it may be manually turned for adjusting parts when the motor circuit is open. Since all essential parts, concerned in the advance of articles by the conveyor, and the application of the labels, receive motion from the main shaft, all such parts move in definite timed relation. While a machine, substantially as just above referred to an illustrated in FIGS. 26 and 27 is especially well adapted for the use of the grip-finger assembly of the present invention, it is to be understood that this novel grip-finger assembly would be useful in any labeling machine of this general type wherein the articles to be labeled are moved along a rectilinear path, with provision for rocking the grip-finger assembly about an axis parallel to said path, from a transfer point at which gummed labels are delivered by a separable-blade picker to the grip-finger assembly, and then, by the latter delivered to an affixing point where the grip-finger affixes the label to the article to be labeled.

As herein illustrated (FIG. 1) and referring to the grip-finger assembly A, shown at the right-hand side of the view, this assembly comprises a base member $M^1$ (which may, for example, be a unitary casting) which is rigidly secured to the rock shaft K. A rigid plate 220 (FIGS. 1, 2 and 3) having substantially parallel and flat front and rear faces is bolted to the base casting $M^1$.

An elongate rigid arm 21 (FIGS. 1, 2, 3, 6, 7 and 13) is fixed at its lower end or is integral with the plate 220 and, extending upwardly from the base M$^1$, provides support for a body label pad P$^1$ (FIGS. 1, 3 and 6) and a neck label pad P$^3$. Considering, for purpose of description, that the member 21 is located at the rear, that is to say, remote from the conveyor path along which the bottles move, the plate 220 has forwardly directed bracket members 25 and 26 (FIG. 3) which are spaced apart at their forward ends and which have axially aligned, screw-threaded bores for the reception of fixed pivot pins 27 and 28, respectively, about which members 29 and 30, respectively, may rock. An inverted U-shaped member 30x (FIG. 3), comprising the downwardly directed spaced legs 31 and 32, integrally joined at their upper ends by a horizontal flange 33, is fixedly bolted to the members 29 and 30 so that it may rock about the axis defined by the pins 27 and 28. Upon the flange 33 of part 30x (FIG. 3) there are mounted spotting devices 34 and 35 which may, for example, be of the type illustrated in the patent to Carter, No. 2,980,278, dated Apr. 18, 1961.

Figure 1:
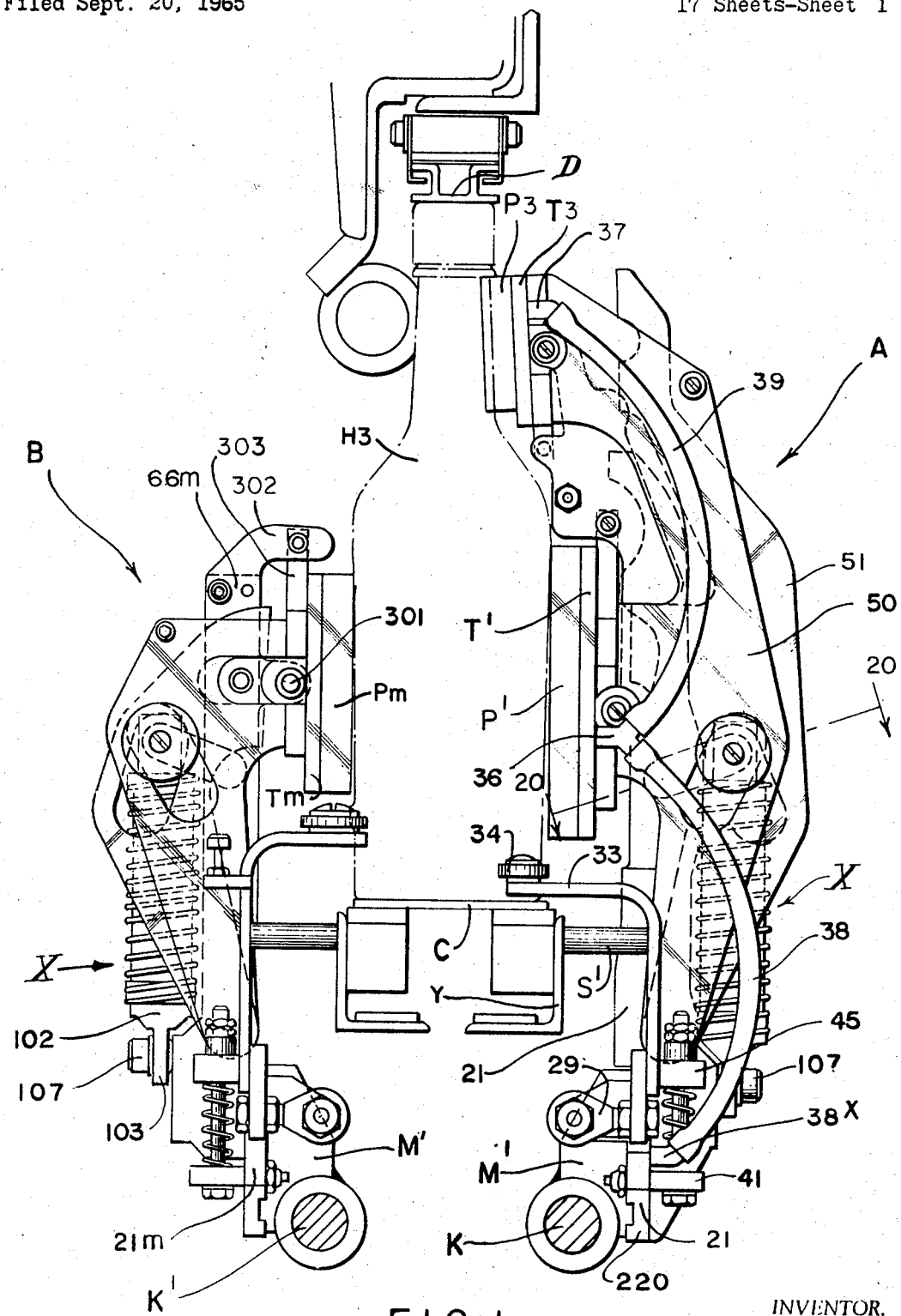
Figure 2:
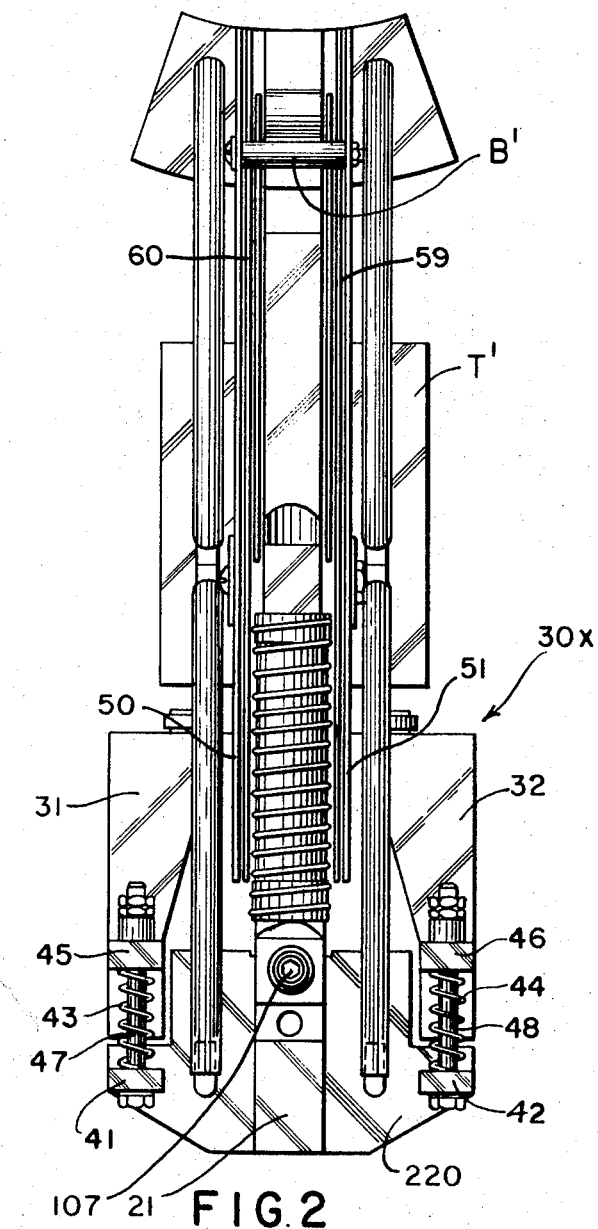
FIG. 2 is an elevation showing the body-and-neck label-applying assembly of FIG. 1 as viewed from the right-hand side of FIG. 1.
Figure 3:
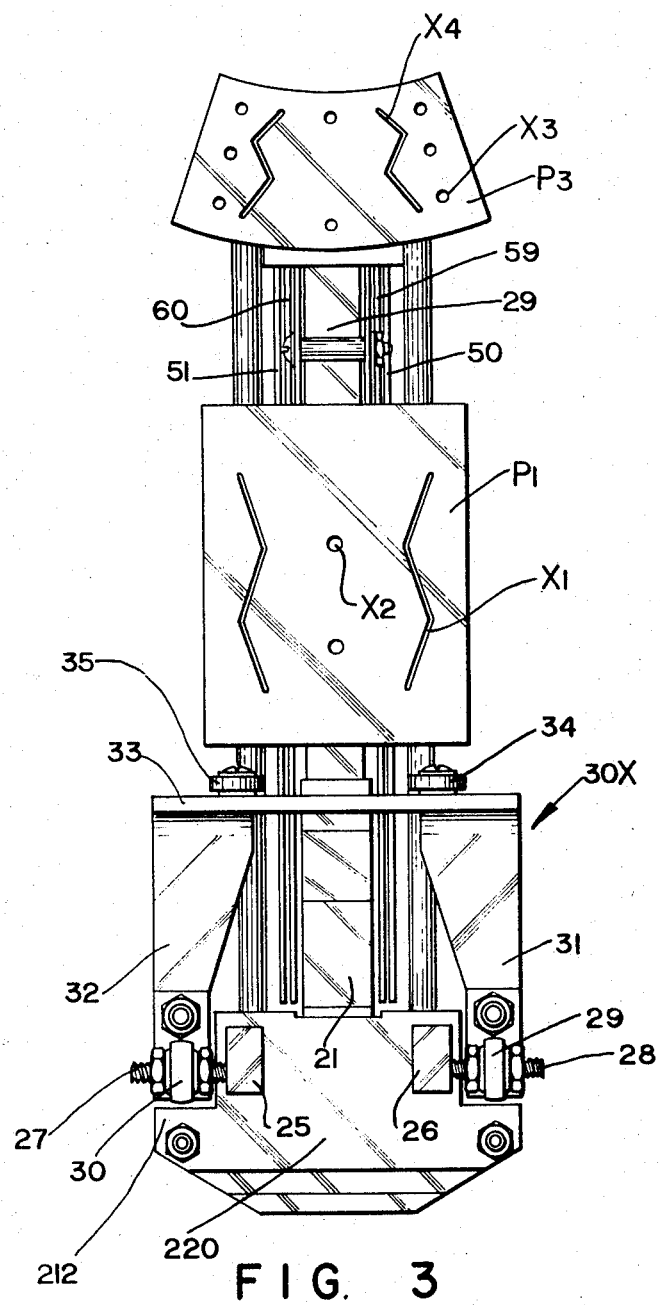
FIG. 3 is an elevation showing the left-hand or inner side of the assembly of FIG. 2, that is to say, showing the label-contacting faces of the pads as positioned for applying labels to a bottle.

Referring to FIG. 2, the plate 220 comprises laterally extending shoulders 211 and 212 from which project rearwardly directed brackets 41 and 42 upon which rest the lower ends of coiled compression springs 43 and 44, the upper ends of these springs bearing against brackets 45 and 46, respectively, which project rearwardly from the lower portions of the members 31 and 32, respectively, of the part 30x (FIG. 3). Desirably, these springs embrace bolts 47 and 48 (FIG. 2) which extend through aligned openings in the brackets 41, 45 and 42, 46 respectively, these bolts having nuts at their lower ends which constitute stops to limit the swing of the flange member 33. The springs constantly urge the flange member 33 to move toward the conveyor support Y (FIG. 1) while a stop member S$^1$ (FIG. 1), desirably of nylon, by contact with one of the supports Y for the conveyor C, limits inward motion of the flange toward the conveyor. As the grip-finger assembly moves along the conveyor, together with the rock shaft K, while affixing and pressing the label into contact with the bottle, the member S$^1$ slides along the side of the conveyor support Y. It may be noted at this point, by inspection of FIG. 1, for example, that the axis of the rock shaft K about which the grip-finger assembly rocks is at a substantial distance below the horizontal plane of the bottle-supporting surface of the conveyor C.

The body label pad P$^1$ (FIG. 1) which is desirably of some resilient material, for example rubber, is fixedly attached as, for example, by adhesive, to a rigid holder or backing plate T$^1$ (FIGS. 1, 2 and 4) preferably of the same superficial area as that of the pad.

Figures 12, 13:
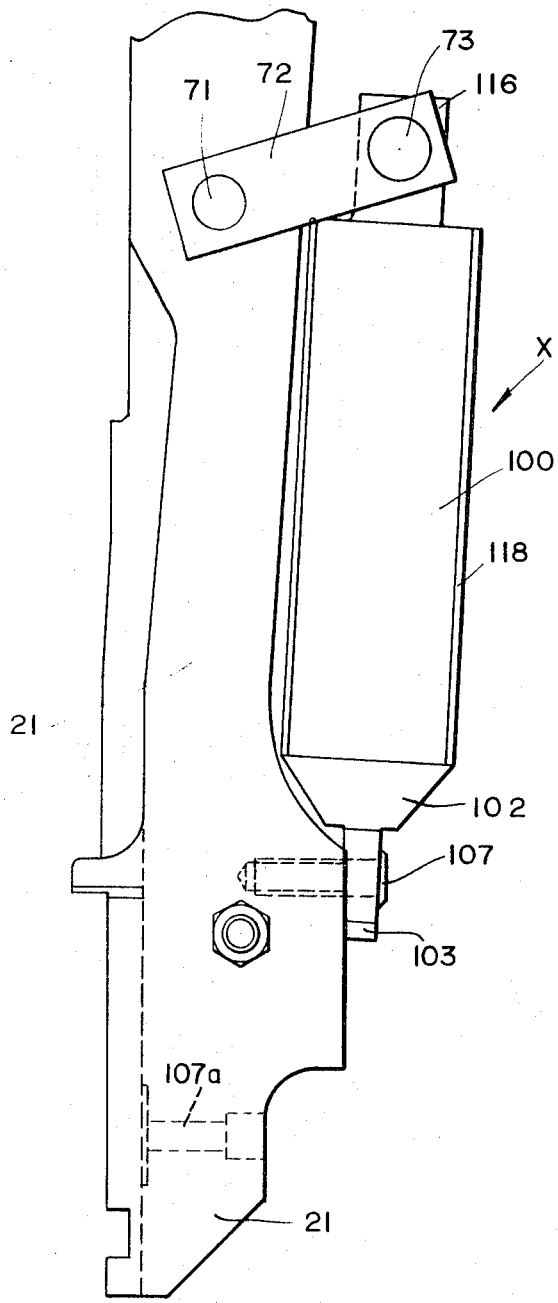
FIG. 12 is a fragmentary, diagrammatic side elevation, omitting parts, indicating the rigid arm or support of FIG. 6; a motor device; and links whereby motion of the motor piston is transmitted to the force-applying levers (the latter being omitted)
FIG. 13 is a smaller-scale side elevation of the rigid arm of the assembly of FIG. 2 by means of which the pressure-applying pads are supported.

Referring to FIG. 13, the arm 21 is shown as provided with a transverse opening Z for the reception of a pivot pin 65 (FIG. 6), by means of which parallel rockers 66a and 66b (FIG. 7), arranged at opposite sides of the arm 21, are pivotally connected to the latter. At their lower ends the rockers 66a and 66b are provided with aligned openings for the reception of a pivot pin 67 (FIGS. 4, 6 and 7) which pivotally supports a bar 67a (FIG. 7) to which the backing plate T$^1$ for the body label pad P$^1$ is secured. The member 67a rocks freely on the pivot pin 67 but is desirably provided, near its upper end, with bearing screws (not shown) which engage the inner faces of the opposite rockers for preserving the accurate relative location of the parts. At their upper ends, the rockers 66a and 66b are provided with aligned openings for a pivot pin or bolt 68 (FIGS. 6 and 7) on which there is pivotally mounted a bar 69 (FIG. 6) to which there is secured the backing plate T$^3$ for the neck label pal P$^3$. The lower end 69s of the bar 69 is provided with adjustable bearing screws (not shown) engageable with the opposite rockers to keep the parts in alignment. A rigid spacer 72 (FIG. 6) connects the rockers to keep them in parallel arrangement and the upper end of the arm 21 is desirably provided with bearing screws (not shown) for the same purpose. By thus mounting the respective plates T$^1$ and T$^2$ upon the pivoted rockers, the pads may automatically adjust themselves so as properly to apply pressure to both labels, regardless of slight variation in bottle shape.

The pad-backing plate or holders T$^1$ and T$^3$ are provided with internal passages or chambers which communicate with suction ports such, for example, as shown at X$^1$, X$^2$, X$^3$ nd X$^4$ (FIG. 3), in the label-affixing pads P$^1$ and P$^3$ respectively, and the plates T$^1$ and T$^3$ are provided with tubular fittings 36, 37 (FIG. 1), respectively, for the attachment of flexible tubes 38, 39, the tube 38 being connected to a fitting 38x in the plate 220 which communicates, by means of appropriate conduits (not shown) with a vacuum pump or other source of low pressure. Valve means of conventional type, establishes suction at the ports in the pressure pads when the latter are at the transfer point thereby to grip a label carried by the picker and to maintain the suction at said ports, at least until the pad has contacted the gummed surface of the label with the article to be labeled, the valve means automatically breaking the suction (or even delivering jets of compressed air) at the pad prior, at least, to retraction of the grip-finger assembly from the article. Valve means for so controlling the suction at a suction grip-finger is disclosed, by way of example, in the patent to Carter, No. 2,940,630, above referred to.

An important object of the invention is to provide means whereby the pressure pad may be applied with "positive" force (as contrasted with spring force) and that the pressure force be applied to the entire area of the label while the picker blades are opening thereby to spread the glue evenly, and again when the pad is contacting the label with the bottle, said last-named pressure being maintained, as the bottle continues to advance for a predetermined distance, so as to insure the firm adherence of the label to the bottle.

Figure 5:
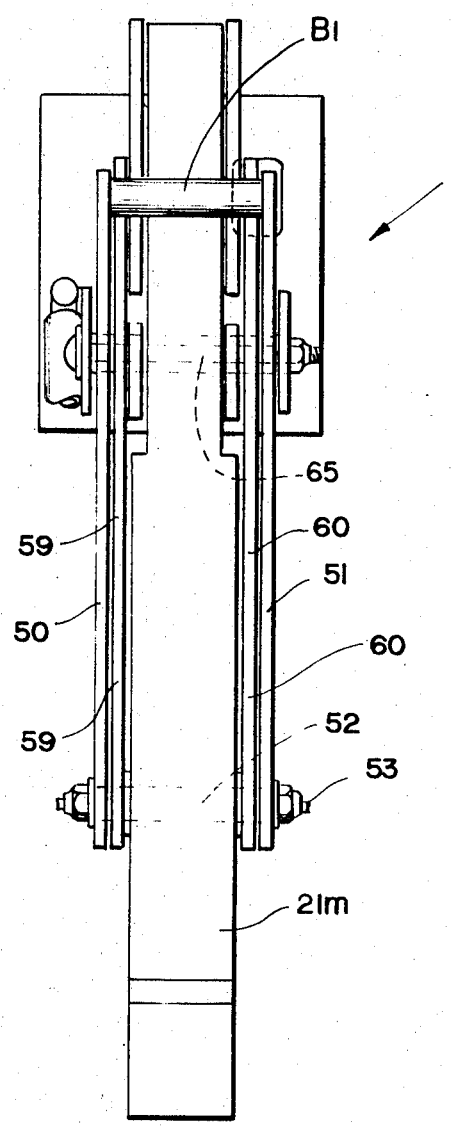
FIG. 5 is a view similar to FIG. 4, but showing the grip-finger assembly which is shown at the left-hand side of FIG. 1, and which is designed to apply body labels only.
Figure 4:
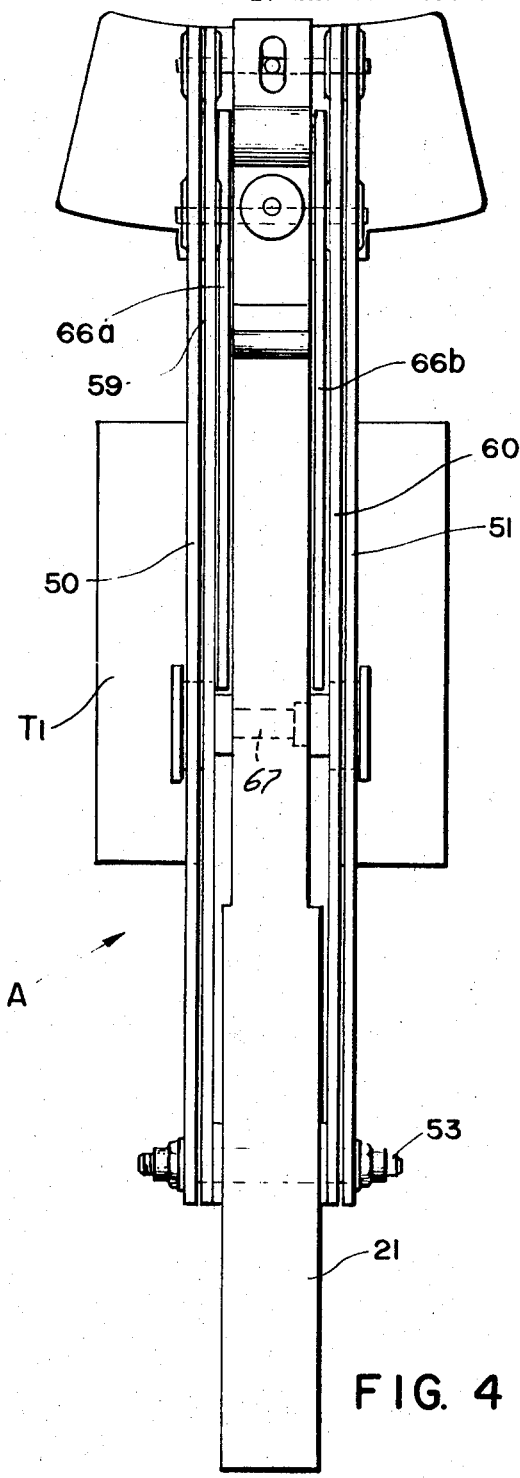
FIG. 4 is a rear elevation, similar to FIG. 2, but to larger scale and omitting parts, and illustrating more clearly the force-applying levers.
Figure 8:
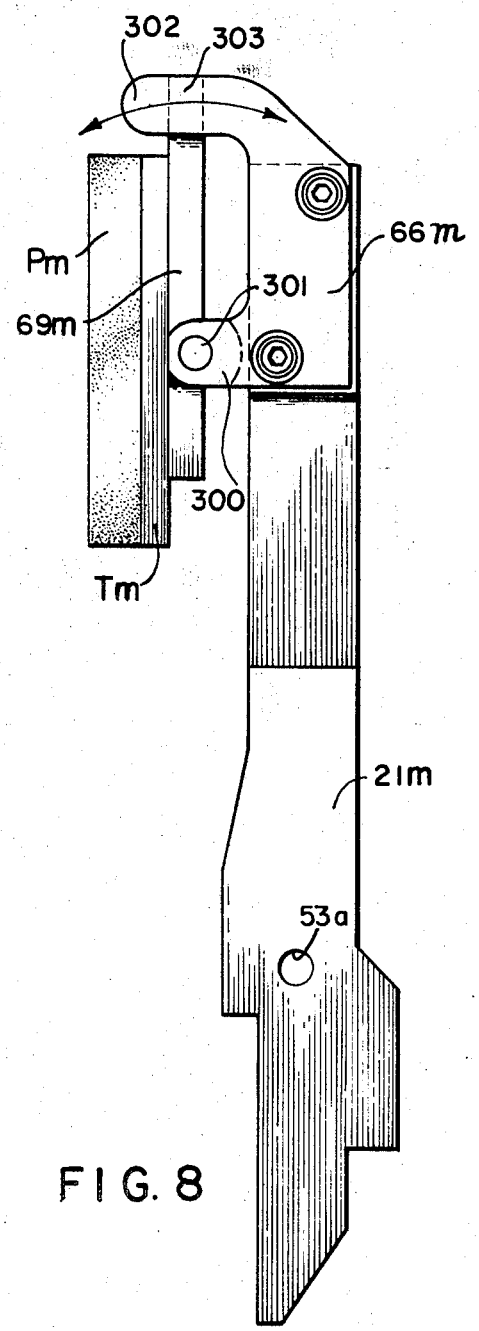
FIG. 8 is a view similar to FIG. 6, but showing the rigid support comprised in the assembly of FIG. 5, together with the means connecting a body label pad thereto.
Figure 9:
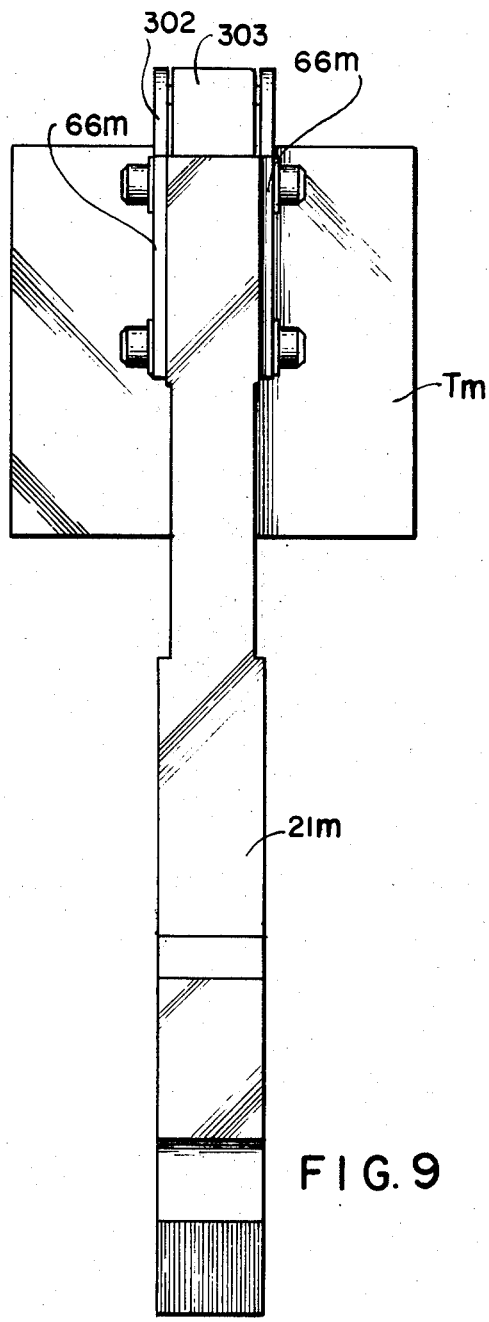
FIG. 9 is a rear elevation of the support of FIG. 8.
Figure 14:
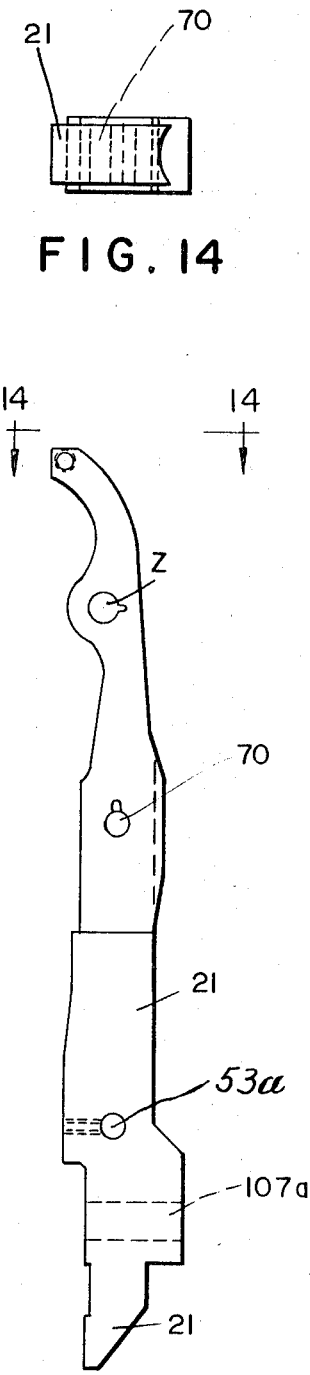
FIG. 14 is a section on the line 14—14 of FIG. 13.

In order to provide such force and to transmit it to the pads at the proper times in the cycle, the present invention provides a grip-finger assembly which comprises two pairs of levers 50, 51 and 59, 60 (FIGS. 2, 3, 4 and 5), one lever of each pair being disposed at each side, respectively, of the arm 21, the levers 59 and 60 (FIGS. 4 and 5) being interposed between the arm 21 and the levers 50 and 51. Each lever is of rigid material and is fulcrumed near its lower end upon one end, respectively, of a pin 53 (FIGS. 4 and 7). The body portion of this pin fits in a transverse hole 53a (FIG. 13) in the arm 21, and the axis about which the levers rock is parallel with and, for example, approximately three inches above the axis of the rock shaft K. While two levers 51 and 52 and 59 and 60 are desirable, in order to distribute the applied force evenly across the pad holder a single suitably designed lever, instead of each respective pair of levers, is contemplated as within the scope of the invention.

The levers 50 and 51 (FIGS. 1, 3 and 11) are identical in shape and construction, the lever 50, for example, being shown in detail in FIG. 11 of the drawings. As shown therein, the lever 50 which may, for example, be of sheet steel of approximately ⅛ of an inch in thickness, is provided with a hole 54 at its lower end for the reception of the fulcrum pin 53 (FIG. 4) and is provided at an intermediate point in its length with a cam slot 55.

Figure 20:
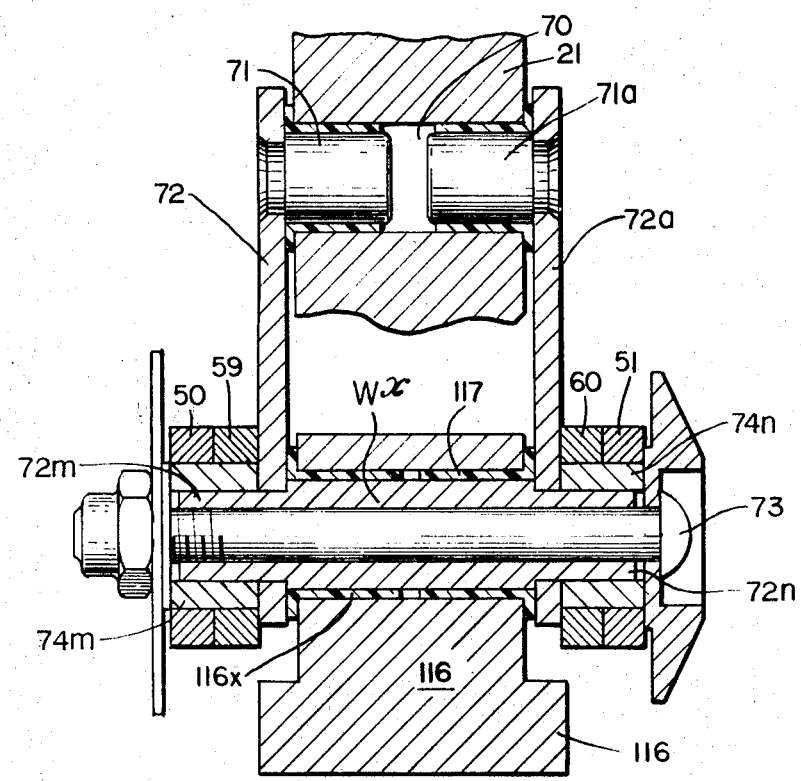
FIG. 20 is a fragmentary diagrammatic section on the line 20—20 of FIG. 1, showing the motion-transmitting links and their fulcrums; their connection to the shackle device; and their relation to the force-transmitting levers.
Figure 17:
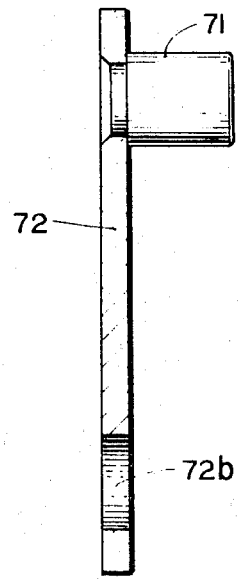
FIG. 17 is a plan view of one of the motion-transmitting links.

As hereinafter described, a cam-follower element 74x (FIG. 20) is disposed within the slot 55 of each of the levers 50 and 51 and is so actuated, at times, as to swing these levers to apply pressure to the pad-holding plates T$^1$ and T$^3$. Each lever 50 and 51 is provided (FIG. 11), intermediate its ends, with a rectilinear edge surface 57 for applying force to the rear face of the holder T$^1$ for the body pad P$^1$ and is also provided near its upper end with a similar edge surface 58 for applying force to the rear face of the holder T³ for the pad P³. Desirably, the edge surfaces 57 and 58 actually make contact with relatively adjustable blocks 57x and 58x (FIGS. 6 and 7) mounted on the plates T¹ and T³. Each of the levers 50 and 51 is provided with a hole 59 (FIG. 11) near its upper end for the reception of the opposite ends of a bolt B¹ (FIGS. 2 and 5) by means of which the upper ends of the levers are connected and held in accurate spaced relation. As shown in FIG. 11, recesses 57m and 58m are provided in the edges 57 and 58, respectively, to clear the ends of the pivot bolts 65 and 68 (FIG. 7).

The axis of the shaft K about which the arm 21 rocks is spaced from the axis of the fulcrum pin 53 (FIG. 4) about which each pressure-applying lever 50 and 51 rocks. The slot 55 in lever 50 is so shaped that a cam action results (through interengagement of the follower elements 74x, FIG. 20) (said elements being the outer races of ball bearings), with the edges of the slot, as the pad-carrying arm 21 is rocked away from or toward the label-affixing position so that just before the pads bring the labels into contact with the article to be labeled (FIG. 24), the edges 57 and 58 of the levers 50 and 51 will contact the rear faces of the blocks 57x and 58x (FIG. 6) carried by the pad holders T¹ and T³ respectively.

The two other levers 59 and 60 (FIGS. 3 and 10) are similar in general to the levers 50 and 51, above described. The two levers 59 and 60 (FIG. 10) are identical in dimensions, preferably being of sheet steel approximately ⅛ of an inch in thickness and each having an opening 61 at its lower end for the reception of the same fulcrum pin 53 (FIG. 4) upon which the levers 50 and 51 are pivoted. Each of the levers 59 and 60 has an inclined cam slot 62 whose inclination is different from that of the slot 55 in the lever 50. The forward edge of each of the levers 59 and 60 has a substantially rectilinear edge portion 63 approximately midway its length and a similar edge portion 64 near its upper end, these portions of the edge of the lever being designed to contact the rear surfaces of the pad holders T¹ and T³ respectively, or, preferably, the adjustable blocks 57x and 58x carried thereby.

The force which the levers 50, 51 apply is, in accordance with the present invention, derived from a self-contained force-generating device X, here designated a "motor device," constituting an element of the grip-finger unit itself. While the force-generating device may be a motor of different type, for example, an electrical solenoid or magnet, it is preferred, in accordance with the present invention, to use a fluid pressure motor.

Figure 15:
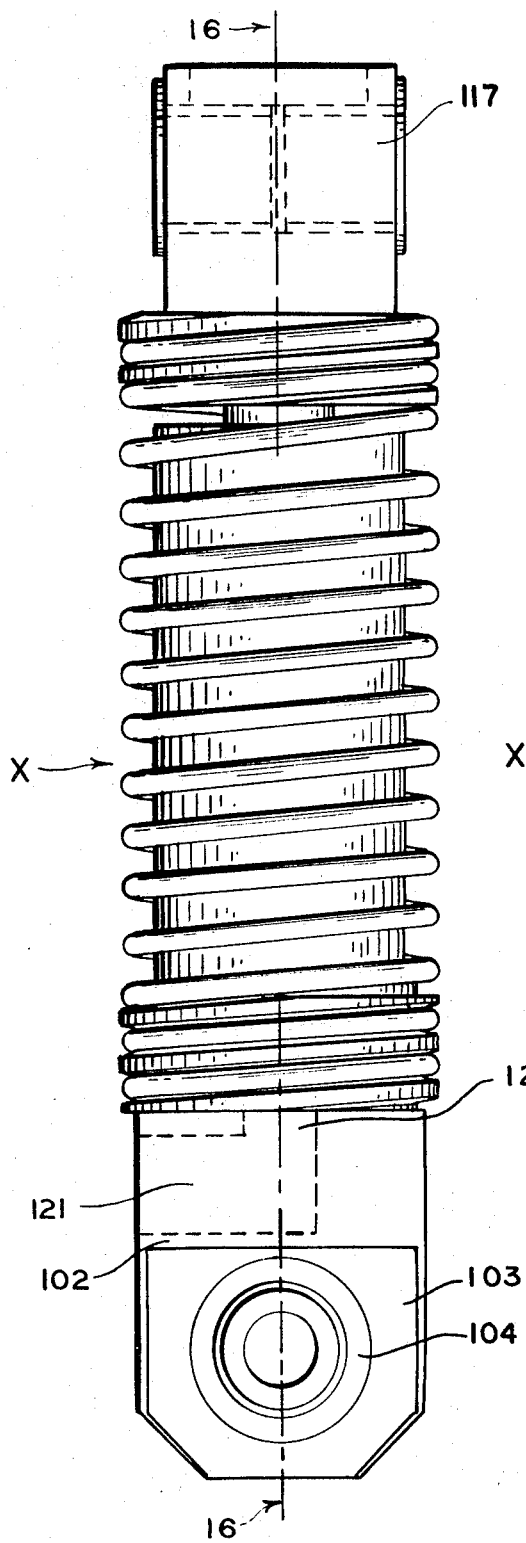
FIG. 15 is an elevation, to larger scale, of a pressure-fluid motor operative to apply force to the label-affixing pads when in the transfer position and also in label-affixing position.
Figure 16:
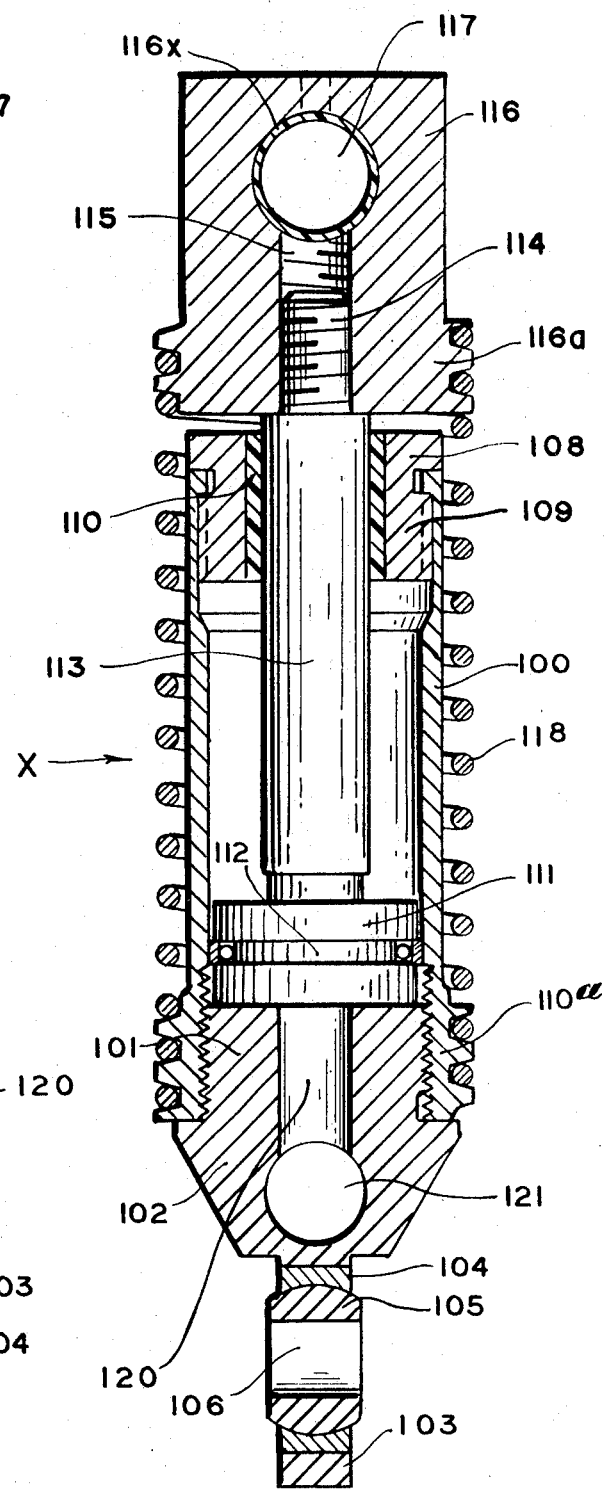
FIG. 16 is a vertical section in the plane of the line 16—16 of FIG. 15.

One embodiment of fluid pressure motor X whereby positive pressure may be applied to the label is illustrated in FIGS. 15 and 16. Referring to these views, the numeral 100 designates the cylinder of the motor, this cylinder being internally screw-threaded at its lower end for engagement with the cylindrical hub portion 101 of a plug 102 having a downwardly directed, integral tongue 103 provided with a transverse opening wherein there is housed a sleeve 104 within which there is a bearing device 105 fitting within a spherically curved socket in the sleeve 104, the bearing 105 having a transverse bore 106 which receives a bolt 107 (FIGS. 1, 12, 21 and 30) which passes through a hole 107a (FIGS. 12 and 13) in the lower portion of member 21, by means of which the motor is secured, with provision for relative rocking, to the grip-finger assembly.

At its upper end the cylinder 100 is closed by a plug 108 (FIG. 16) comprising an externally screw-threaded lower part 109 which engages internal threads in the upper part of the cylinder, the plug having on axial bore preferably provided with a lining sleeve 110 of nylon, or the like, suitably secured in place. Within the cylinder there is a piston 111 (FIG. 16) provided with a peripheral groove 112 for the reception of packing, here shown as comprising an interior O-ring, for example, of steel, and an exterior sealing ring, for example, of nylon, which engages the inner surface of the cylinder wall. The piston 111 is rigidly attached to the lower end of a rod 113 which extends upwardly and through the sleeve 110 and at its upper end has a portion 114 of reduced diameter which is externally screw-threaded for engagement with an internally screw-threaded bore 115 in a shackle member 116, this shackle member having a transverse bore 117 which, as here shown, has a lining sleeve 116x desirably of nylon or material having similar characteristics. The lower part 116a of the shackle 116 is of somewhat larger diameter than the body portion and is externally screw-threaded for the reception of the upper coils of an open coiled tension spring 118 of an internal diameter somewhat larger than the external diameter of the cylinder 100 and whose lower end engages external screw threads on the somewhat enlarged lower portion 110a (FIG. 16) of the cylinder.

As illustrated in FIG. 16, the plug 102 which closes the lower end of the cylinder 100 is provided with an axial passage 120 which opens into a transverse passage 121 which extends only part way through the plug 102 and which receives a fitting 122 (FIG. 21) for the reception of a flexible tube 123 which receives fluid under pressure, for example compressed air, from a suitable source (not here illustrated), the delivery of fluid through the tube 123 being automatically controlled by a three-way valve (not here shown) of a type conventional in the art which, at times, admits pressure fluid (either gas or liquid) to the lower end of the cylinder; at other times, connects the interior of the cylinder to a vacuum pump; and at still other times exhausts the cylinder to atmosphere.

After the pads have received labels from the picker blades and the picker blades have opened, and as the grip-finger assembly nears the affixing position, the valve admits pressure fluid to the cylinder and the resultant pressure force thus established is then maintained until just before the grip-finger assembly retreats from the article at which time the valve is so actuated as to connect the fitting 122 to a vacuum pump.

The tension spring 118 exerts constant force tending to pull the shackle 116 downwardly and with it the piston rod and piston so that the latter is normally at the lower end of the cylinder. When the three-way valve which controls the admission of fluid pressure to the cylinder is set so as to permit escape of fluid from the cylinder and at the same time to connect the lower end of the cylinder to the vacuum pump, the spring 118 exerts a force which aids in quickly returning the parts to normal position.

Figure 18:
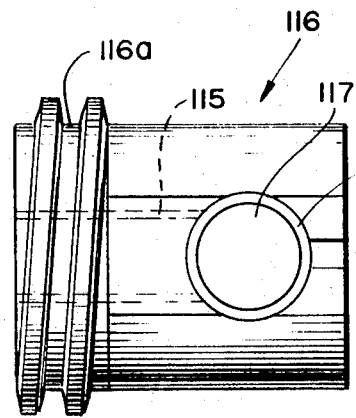
FIG. 18 is a side view of the shackle which is moved by the motor piston and to which the motion-transmitting links are pivotally connected.
Figure 19:
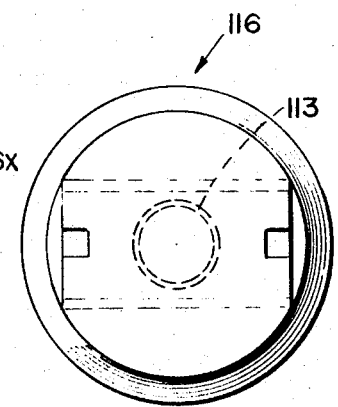
FIG. 19 is an elevation of the right-hand end of the shackle of FIG. 18.

As shown in FIG. 13, the arm 21 has a transverse hole 70 approximately midway between its ends which receives two axially aligned studs 71, 71a (FIG. 20) projecting toward each other from the adjacent end portions of spaced parallel link members 72, 72a disposed at opposite sides, respectively, of the part 21. At their opposite end portions the links 72 and 72a have holes 72b (FIG. 17) through which the end portions 72m and 72n (FIG. 20), respectively, of a rigid elongate sleeve Wx are received. The midportion of this sleeve, between the links, is located within the nylon sleeve 116x which lines the bore 117 (FIGS. 16 and 18) in the shackle member 116. Nylon bushings 74m, 74n on the outer end portions of the sleeve Wx constitute anti-friction cam-follower elements which are received in the cam slots 62 and 55 (FIGS. 10 and 11) in the force-applying levers. A bolt 73, passing through washers, contacts the outer radial faces of the bushings 74m and 74n and passing through the sleeve Wx, holds the parts in assembled relation.

Since the cylinder 100 of the motor device is anchored at its lower end (and thus the cylinder itself cannot move upwardly), the upward movement of the piston moves the shackle 116 upwardly and with it the sleeve Wx (FIG. 20), such movement of the shackle and bolt causing the parts 74m and 74n to move along the slots 62 and 55, resulting in a swinging of the force-transmitting levers about the axis of the bolt 73.

During the rocking of the grip-finger assembly away from the conveyor, at the completion of the application of a label, pressure-fluid is released from the cylinder 100 and subatmospheric pressure is established below the piston 111 which, assisted by the spring 118, restores the piston to the lower end of the cylinder. Levers 50 and 51 are thereby moved away from the pad holders while levers 59 and 60 still remain in contact with the pad holders, the parts, as so positioned, being at the transfer point as illustrated in FIG. 23. This position of the levers is maintained as the grip-finger assembly retreats to the point most removed from the conveyor path (FIG. 22) at which the entire grip-finger assembly is beyond the path of the picker and this position of the levers is still maintained as the grip-finger assembly now returns toward the affixing point and continues to be maintained as the grip-finger assembly arrives at the label transfer position where the pads contact labels carried by the picker. While the pads thus contact the labels, the picker blades separate and spread the gum uniformly over the label.

As soon as the picker blades are spread widely enough, the presser pads pass between the separated blades while the grip-finger continues its movement toward the affixing position. As the presser pads approach the affixing position (FIG. 24), the levers 50 and 51 (having left behind them the levers 59 and 60), contact the plates $T^1$, $T^3$. As one or the other pad first encounters the bottle, the rockers 66a and 66b move to permit the two pads to exert equal pressure on the bottle (FIG. 25). The motor device now exerts force thereby to press the label into intimate contact with the bottle. At this time the grip-finger assembly is moving along the conveyor path at the same linear velocity as the bottle, and the pressure against the label is maintained until the grip-finger begins to swing away from the conveyor path in returning to its initial position, whereupon the fluid pressure at the motor device X drops below atmospheric and the motor device becomes effective to move the levers 50, 51 away from the bottle.

The grip-finger assembly B, shown at the left side of FIG. 1, is in general like the assembly A already described except, in particular, it does not include a neck label pad and associated parts. Thus, as shown in FIGS. 1, 5, 8 and 9, the assembly B comprises the pad-supporting arm 21m similar in function to the arm 21 of the assembly A, but which does not extend upwardly so far as does the arm 21. To the upper end portion of arm 21m, brackets 66m (FIGS. 1, 8 and 9) are fixed, these brackets having lower arms 300 which support a pivot member 301 upon which a vertically elongate bar 69m is pivoted. To this bar the pad-carrying plate Tm is secured, the body label pad Pm being attached to this plate. The brackets 66m have upper arms 302 acting as guides for confining the upper portion 303 of the bar 69m thereby steadying the pad Pm as it rocks. Since but one pad is employed in the grip-finger assembly B, it suffices to mount this pad so as simply to rock about the fixed pivot 301 (FIG. 1) in order that it may apply uniform pressure to the label, and since only one pad is employed, the force-applying levers 50 and 51 and 59 and 60 do not require the pad-contacting surfaces 58 and 64 illustrated in FIGS. 10 and 11.

As, in other respects, the assembly B is substantially like the assembly A, further detailed description of the assembly B appears unnecessary, corresponding parts being designated by the same numerals as in the grip-finger assembly A.

Since in accordance with the present invention each grip-finger assembly embodies in itself an independent motor for generating force for applying label transfer and affixing pressure, it is possible (even in a machine of the kind wherein bottles to be labeled move uninterruptedly along the conveyor path while the labels are being applied) to maintain affixing pressure as long as desired, and so to space the grip-finger assemblies as to provide adequate room in which to separate the picker blades sufficiently to accommodate wide transfer pads and labels, and then, so to time the operation that while a grip-finger assembly of one labeling unit applies labels to recurrent bottles, only, a grip-finger assembly of another labeling unit concomitantly applies labels to intervening bottles.

Referring to FIGS. 26 and 27 and considering a grip-finger at label-applying station $L^1$, this grip-finger, having been furnished with a label, applies it to a moving bottle and travels with the bottle a predetermined distance, at least, as great as the center-to-center distance between two successive bottles, and having travelled this distance the grip-finger rocks away and down from the conveyor path thus avoiding the picker and returns to the starting point where it is aligned with the magazine. It then moves up to the transfer position where it receives another label, and then, as the picker blades separate, rocks toward the conveyor path and the affixing position. During this period of time, bottles have been advancing continuously along the conveyor path, and some will have passed the point at which the first bottle, as above described, has received a label. These unlabeled bottles will continue along the conveyor path to be labeled at the No. 2 labeling station.

By allowing some of the bottles to be labeled at the first station and others at the second station, it is possible, with the arrangement shown, to apply four labels simultaneously but without crowding the pickers and it is possible to separate the picker blades widely enough to permit a label-size grip-finger to pass between them while at the same time insuring uniform spreading of adhesive over the entire area of the label.

In an arrangement such as that illustrated in FIGS. 26 and 27 wherein certain of the pickers and grip-fingers function alternatively with others, these parts may be operated by cams and levers in a manner similar to the corresponding parts shown in Pat. No. 2,940,630, but with the actuating elements relatively arranged, in a way obvious to one skilled in the art, to operate the pickers and grip-finger assemblies in proper sequence.

While it would be possible so to time the machine that grip-fingers at each labeling station and corresponding wipers of each group would apply pressure to bottles at the same instant in a given label-applying cycle, such an arrangement is not desirable as a practical matter since the maximum pressure load so applied would be substantial and if confined to a short arc of a revolution of the main shaft would require an unnecessarily large expenditure of power and would tend to set up vibrations. To avoid these undesirable features and to distribute the power requirements more uniformly, the present invention contemplates a timing of the operating parts such, for example, that the first grip-finger of the second labeling station becomes effective 40° further along in a given cycle (that is to say, during a single revolution of the main shaft) than the first grip-finger of the first labeling station and with such timing of the several groups of pressers so as to distribute the load and void vibration.

Figure 29:
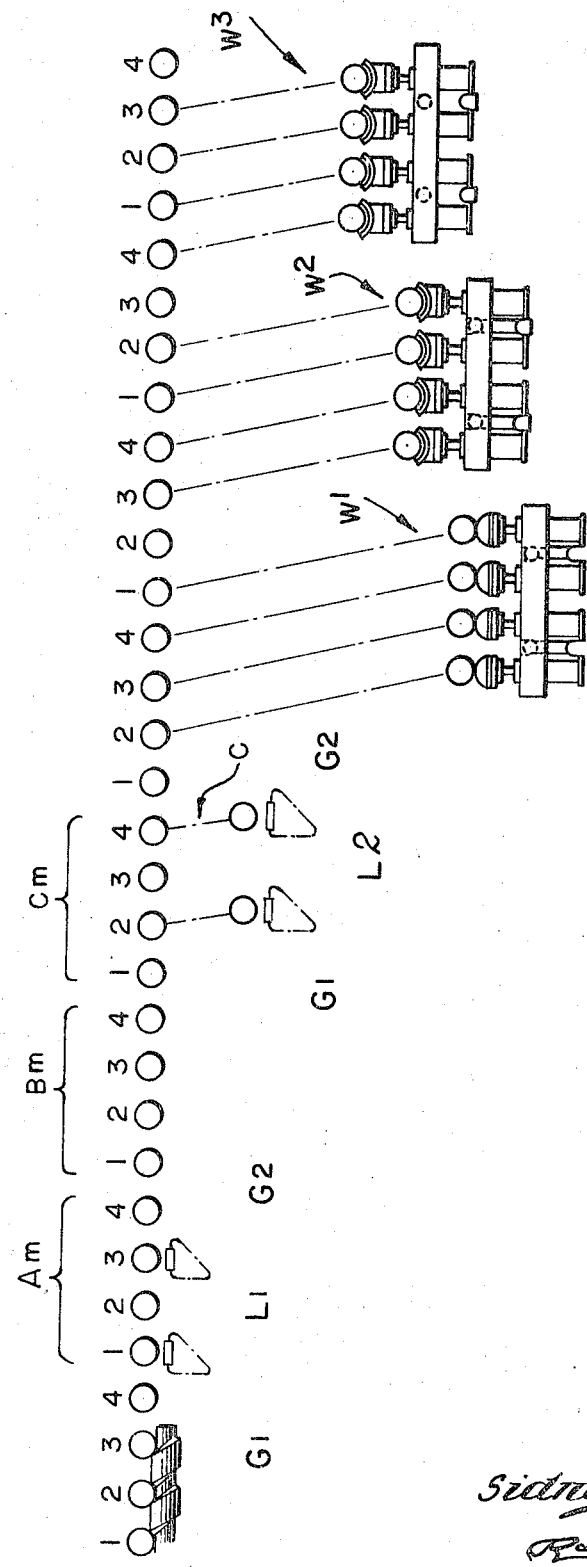
FIG. 29 is a diagrammatic plan view, illustrative of a desirable coordination of the motions of a plurality of labeling units in a machine employing grip-finger assemblies such, for example, as those herein specifically described.

FIG. 29 diagrammatically illustrates a preferred arrangement of two labeling stations and associated sets of wipers and shows a row of bottles which are being advanced uninterruptedly from labeling station $L^1$ to labeling station $L^2$. The bottles are designated as being arranged in groups Am, Bm and Cm, each group containing four bottles successively numbered 1, 2, 3 and 4 respectively. Assuming that grip-finger $G^1$ of labeling station $L^1$ is so timed as to apply a label to bottle No. 1 of group Am and that grip-finger $G^1$ of station $L^2$ applies a label to a bottle 40° later in the cycle (that is to say, 40° later in the rotation of the main shaft), then the bottle of group C$m$ to which grip-finger G$^1$ of labeling station L$^2$ will apply a label will be bottle No. 2 of group C$m$, since 360° divided by forty equals nine. Counting nine bottles, beginning with bottle No. 2 of group A$m$, it turns out that the ninth bottle is No. 2 of group C$m$. At station L$^1$ alternate bottles (1 and 3) receive labels and thus at station L$^2$ the intervening previously unlabeled bottles (2 and 4) of group C$m$ will receive labels.

As above suggested, the wipers of the several groups may be of any desired type, for example pressure wipers, for example like those disclosed in the above patent, No. 2,940,630, or, alternatively, wipers of other type, for instance brush type wipers, such as shown in the patent to Carter, No. 2,925,931, dated Feb. 23, 1960. The several wipers may be actuated by such mechanisms as disclosed in the above patents or by any other appropriate means.

Figure 30:
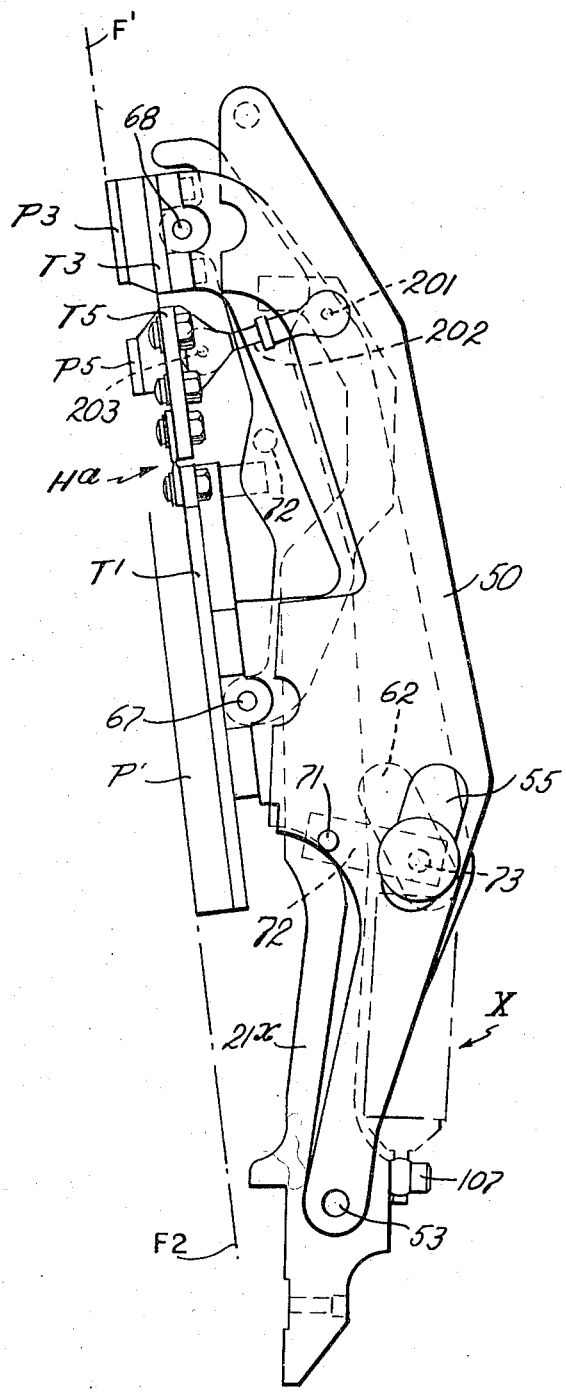
FIG. 30 is a fragmentary elevation illustrating a modified grip-finger assembly capable of applying a shoulder label as well as body and neck labels.
Figure 32:
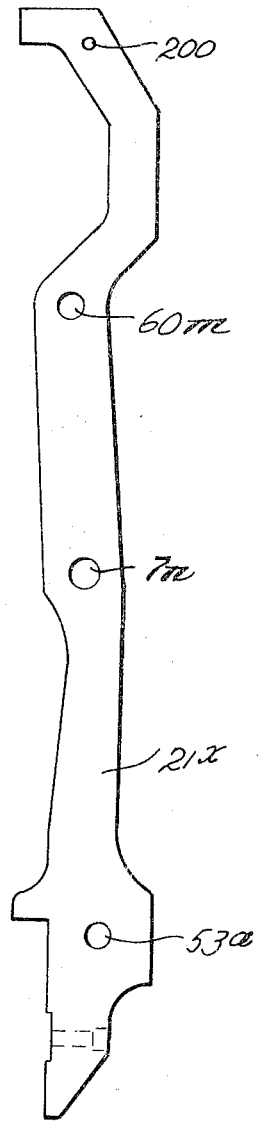
FIG. 32 is a view similar to FIG. 13, but showing a modification.
Figure 31:
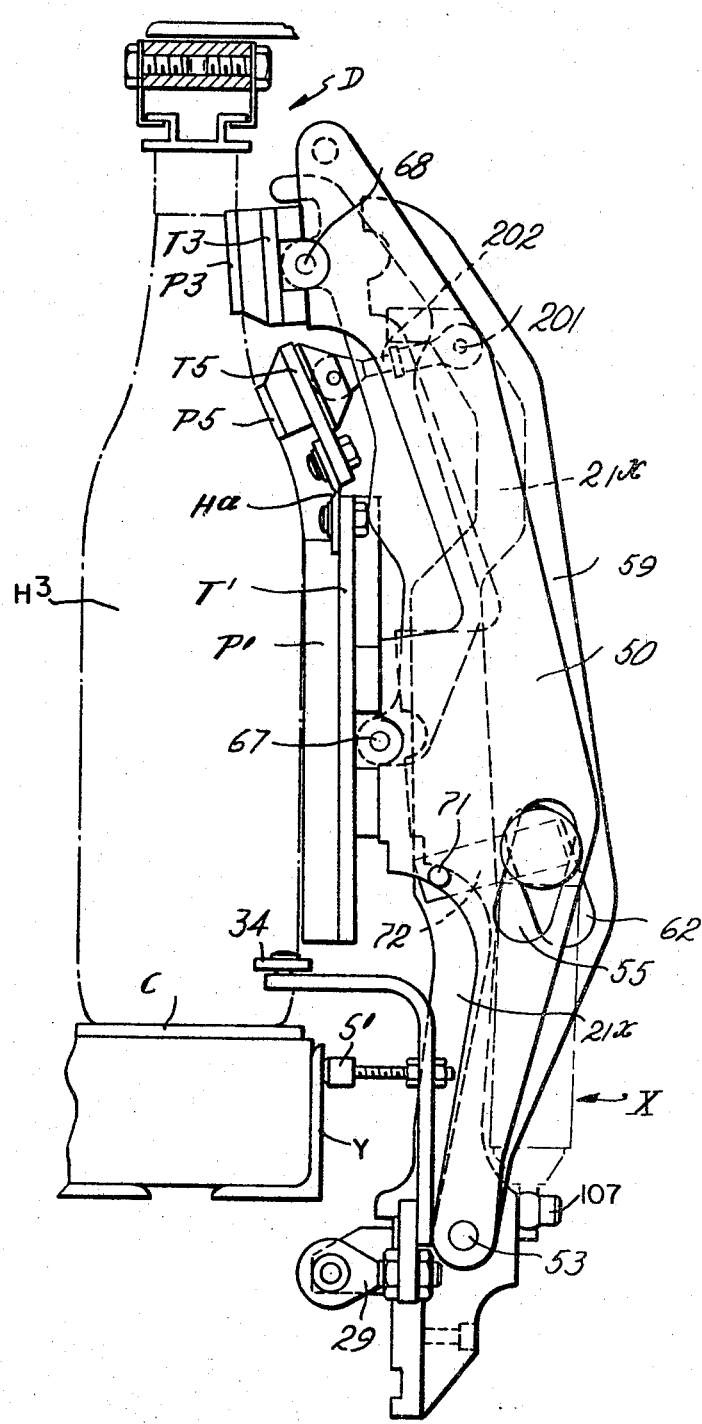
FIG. 31 is a view similar to FIG. 30, showing the parts in position for affixing the label to a bottle.

A modified embodiment of the invention is illustrated in FIGS. 30, 31 and 32 wherein parts like those shown in the previous views are designated by the same reference characters, a bottle H$_3$ being shown in label-receiving position in FIG. 31. In FIG. 32 the character 21$x$ designates a rigid support corresponding in general function to that of the support 21 of FIG. 13—the hole 60$m$ receiving a pivot pin like the pin 65 (FIG. 7) for the rocker links 66$a$, 66$b$; the hole 70$n$ receiving the pivot studs 71, 71$a$ (FIG. 20) to which the links 72, 72$a$ (FIG. 20) are secured; and the hole 53$a$ (FIG. 7) receiving the pivot pin 53 upon which the levers 50, 51, 59 and 60 are mounted. However, the part 21$x$ (FIG. 32) extends upwardly beyond the hole 60$m$ a distance substantially greater than is true of the part 21 (FIG. 13) and is provided at its upper end with a hole 200 (FIG. 32) which receives a pivot bolt 201 to which is pivotally connected one end of a link 202 of adjustable length whose opposite end is connected by a pivot 203 to a plate T$^5$ whose lower end is connected by a hinge H$a$ (FIG. 30) to the upper edge of the plate T$^1$ to which the body label pad P$^1$ is secured. A shoulder label pad P$^5$ is attached to the left-hand face of the plate T$^5$ (as viewed in FIGS. 30 and 31), this pad P$^5$ being provided with suction orifices (not shown) like those in the pads P$^1$ and P$^3$.

Since the pivot pin 201 is horizontal, the free end of link 202 swings up and down about this pin and since the upper edge of the plate T$^1$ rocks back and forth during the label-affixing operation, the angle of inclination of the plate T$^5$ will vary as determined by the length of the link 202. As illustrated in FIG. 30, the length of the link has been so adjusted that when the grip-finger assembly is at the transfer position (where in FIG. 30 the plane of the picker blades is indicated by the broken line F$^1$, F$^2$) the label-contacting faces of the body label pad P$^1$, the neck label pad P$^3$ and the shoulder label pad P$^5$ will all lie in the same plane so that they may all receive labels from the picker blades at the same time. However, as the grip-finger assembly moves toward the affixing position, (shown in FIG. 31), the angle of inclination, to the vertical, of the respective pads P$^1$, P$^3$ and P$^5$ changes, the label-affixing face of the pad P$^1$ being here shown as substantially vertical and in position to apply a body label, the label-applying face of the pad P$^3$ being slightly inclined to the vertical according to the very steep slope of the neck of the bottle, while the label-applying face of the pad P$^5$ is inclined approximately 60° to the vertical, appropriate to apply a label to the bottle shoulder.

In this arrangement pressure derived from the motor X is not applied directly to the shoulder pad P$^5$ but pressure is applied indirectly to said pad through the supporting plate T$^5$ for the shoulder label pad P$^5$. Furthermore, because the link 202, when the parts are in the affixing position (FIG. 31), is almost perpendicular to the plane of the plate T$^5$, very substantial pressure is derived directly from the grip-finger assembly as a whole as the rigid arm 21$x$ moves toward the label-affixing position.

While desirable embodiments of the invention have herein been disclosed, it is to be understood that the invention includes all such equivalent parts and combination of parts as are within the terms of the appended claims.

I claim:

1. In combination, in a labeling machine of the kind which comprises a separable-blade, gum-coated picker for carrying a label from a magazine to a transfer station, a grip-finger comprising a suction pad for taking the label from the picker and affixing it to the article to be labeled, and a part operated by fluid pressure for applying force to the pad while the latter is in contact with a label carried by the picker thereby to spread the gum uniformly over the label.

2. In combination, in a grip-finger assembly, a pad for affixing a gum-coated label to an article which is to be labeled, a rigid, movable plate to which said pad is attached, a fluid-pressure motor comprising a cylinder, a piston therein and a rod attached to the piston, means for transmitting motion of the piston rod to said plate thereby to apply compressive force to the pad, spring means normally tending to hold the piston in inoperative position, and means for so admitting pressure-fluid to the cylinder as to move the piston and thereby apply force to the pad-supporting plate.

3. A grip-finger assembly comprising, as a unit, a base, a rigid, elongate arm fixed to the base, a pad-supporting plate pivotally secured to the arm, a yieldable, label-affixing pad attached to the plate, a fluid-pressure motor mounted on the base, said motor including a cylinder and piston, means, including a rigid lever, for transmitting motion from the piston to said pad-supporting plate, and means for so admitting pressure-fluid to the cylinder as to move the piston and thereby apply force to the pad-supporting plate.

4. A grip-finger assembly comprising a base, a rigid pad-supporting arm fixed at its lower end to the base, a rigid pad-carrying plate pivotally attached to said arm, and a label-affixing pad secured to the inner face of said plate, two rigid force-applying levers, one arranged at each side, respectively, of said arm, said levers being pivotally secured near their lower ends to the arm and having their upper ends normally spaced from but arranged to apply force to the plate, and a force-generating device attached to said base and which is operative, at times, to rock said levers and cause the levers to apply pressure to the plate.

5. A grip-finger assembly according to claim 4, wherein the force-generating device is a fluid-pressure motor comprising a cylinder, a piston therein, and a piston rod secured to the piston, means pivotally attaching the lower end of the cylinder to the base, a shackle to which the piston rod is secured, tension spring means connected to the shackle and which is operative normally to hold the piston in the lower end of the cylinder, and means for admitting pressure fluid to the lower end of the cylinder thereby to raise the piston, the shackle having a transverse opening and a pivot element arranged within said opening with its opposite ends projecting from the shackle, a pair of rigid links, each pivoted at one end to the supporting arm and each provided at its opposite end with a hole for the reception, respectively, of one of the projecting ends of said pivot element, each of the force-applying levers having a cam slot therein, cam-follower means mounted on said pivot element and extending through the cam slots of the several levers, the slots being so contoured that rising of the piston, while the grip-finger assembly is near the label-affixing position, causes the levers to be swung to bring their upper ends into contact with the outer face of the pad-carrying plate thereby forcibly to urge the latter toward the article to which the label is to be affixed.

6. A grip-finger assembly according to claim 4, wherein the force-generating means is a fluid-pressure motor comprising a cylinder, a piston therein, and a piston rod secured to the piston, means attaching the lower end of the cylinder to the base, a shackle to which the piston rod is secured, tension spring means connected to the shackle and which is operative normally to hold the piston in the lower end of the cylinder, and means for admitting pressure fluid to the lower end of the cylinder thereby to raise the piston, the shackle having a transverse opening and a pivot element arranged within said opening with its opposite ends projecting from the shackle, a pair of rigid links, each pivoted at one end to the supporting arm and each provided at its opposite end with a hole for the reception, respectively, of one of the projecting ends of said pivot elements, each of the force-applying levers having a cam slot therein, cam-follower means mounted on said pivot element and extending through the cam slots of the several levers, the slots being so contoured that when the grip-finger assembly is most remote from the affixing position the rising of the piston causes the levers to be swung to bring their upper ends into contact with the outer face of the pad-carrying plate thereby forcibly to press the affixing pad against the label carried by the picker.

7. A labeling machine of the kind wherein constantly moving conveyor means advances articles, to be labeled, along a rectilinear path through a label-applying zone and which comprises a grip-finger assembly including a suction pad which takes a label from a gum-coated picker and affixes it to an article to be labeled, and wherein the grip-finger assembly moves, with the article, a predetermined distance while maintaining pressure upon the label, characterized in that the grip-finger assembly includes a motor device operative to generate force, and further characterized in that the grip-finger assembly comprises two rigid levers for transmitting force from the motor device to the presser pad, each of said levers having therein a cam slot, a cam-follower element engaging each respective cam slot, the cam-follower elements being bodily movable by the motor thereby moving said levers, the cam slots being so devised as to cause one lever to apply force to the pad while the latter is at the transfer point and to cause the other lever to apply force to the pad when the pad is at the affixing point.

8. Apparatus according to claim 7, wherein, for transmitting motion from the motor device to the cam-followers which engage the cam slots in the levers, a pair of parallel links is arranged to support the cam-followers, said links being arranged to rock about a fixed pivot at one end and being pivotally connected to an element moved by the motor at their other ends.

9. Apparatus according to claim 7, wherein the motor device comprises a cylinder having a piston therein, means for admitting pressure-fluid to one end of the cylinder thereby so to move the piston as to apply force to the pressure pad, and spring means operative to restore the piston to its initial inoperative position upon release of pressure-fluid from the cylinder.

10. In a grip-finger assembly for use in a labeling machine of the kind in which an article to be labeled moves uninterruptedly while the label is being affixed thereto, and which comprises a support for a suction-type label-affixing pad, said support being pivoted to swing in an arcuate path thereby to carry the pad from a transfer station, where it receives a label from a gum-coated picker, into affixing relation to the article to be labeled, in combination, a motor device attached to and moving with said support and which is operative, while the label-affixing pad is disposed at the transfer station, to apply positive force to the pad thereby to insure contact of the entire area of the label with the gummed face of the picker.

11. A grip-finger assembly for use in a labeling machine of the kind wherein a label is affixed to an article while the article is in motion along a rectilinear path and which comprises conveyor means which uninterruptedly advances an article to be labeled along said path and through a labeling zone, and wherein the machine also comprises an axially movable rock shaft whose axis is parallel to said path and to which the grip-finger assembly is fixed, said grip-finger assembly comprising a suction pad for placing a label in contact with an article to be labeled, and means so actuating the shaft that the pad moves from a transfer point where it receives a gum-coated label from a picker into affixing relation to an article where the pad holds the gum-coated surface of the label in contact with the article which is to be labeled while the article is moving along said path a predetermined distance, characterized in that the grip-finger assembly includes, as an element, a force-generating motor device which moves, as a part of the assembly, from the transfer point into affixing relation to the article to be labeled and which is operative, while the grip-finger pad is moving along said path with the article, to hold the label in contact with the article while applying positive force to the pad so as to insure adhering contact of the entire area of the label with the article intended to receive it.

12. A grip-finger assembly according to claim 11, wherein the pad-supporting arm carries two rigid pad holders, the holders being pivoted to rock about spaced parallel axes, and a label-affixing pad secured to each holder, the holders being so arranged that one pad is operative to affix a neck label and the other to affix a body label, further characterized in that the force-transmitting means comprises a lever arm of such shape as to apply positive force simultaneously to both holders.

13. A grip-finger assembly according to claim 11, further characterized in that the force-generating device is a fluid-pressure motor comprising a movable part, rigid means for transmitting force from said movable part to the grip-finger pad, and valve means operative automatically to supply pressure-fluid to the motor or alternatively to connect the motor to a source of sub-atmospheric pressure.

14. A grip-finger assembly according to claim 13, wherein the part operated by fluid-pressure is an element of a fluid-pressure motor comprising a cylinder and a piston therein, means, comprising a rigid part, for transmitting force from the piston to the grip-finger pad, and means for supplying pressure-fluid to the motor for actuating the piston.

15. In a labeling machine of the kind in which a grip-finger assembly, which rocks back and forth between a transfer point and affixing relation to an article to be labeled, comprises a pad which receives a gum-coated label at a transfer point and moves into affixing relation to an article to be labeled, in combination, a fluid-pressure motor comprising a cylinder having a piston therein, the piston being provided with a rod, means, comprising a rigid lever, for transmitting motion of the rod to the grip-finger pad, means for admitting pressure fluid to the cylinder thereby to move the piston in a direction such as to cause the pad to exert force against the label, and means operative to release the pressure-fluid from the cylinder when the grip-finger assembly arrives at the transfer position in rocking away from the conveyor path.

16. A grip-finger assembly for use in a labeling machine comprising means for supporting an article to be labeled, and a picker operative to support a gum-coated label in transfer position, said assembly comprising a rigid arm so supported, near one end, as to be capable of rocking in a vertical plane, a pad holder, carrying a resilient pad, so mounted upon said arm as to be carried, as the arm rocks, from a transfer position, where it receives a gum-coated label from the picker, to an affixing position where it contacts the gum-coated surface of the label with the article to be labeled, characterized in that the grip-finger assembly comprises a fluid-pressure motor device operative to develop force, and means, including force-transmitting levers, attached to the pad supporting arm and which are operative to transmit force from the motor device to the pad holder when the latter is in the transfer position thereby to assure contact of the entire surface of the label with the gum-coated surface of the picker and to maintain said force for a predetermined time after the pad holder has arrived at the affixing position.

17. A grip-finger assembly according to claim 16, wherein, at each side, respectively, of the rigid pad-supporting arm there is arranged a rigid lever pivotally supported to swing about an axis parallel to and near the axis about which the rigid arm rocks, the free end portions of said levers being so disposed that they may contact the pad holder when the latter is at the transfer position, and means whereby the force developed by the motor is transmitted simultaneously to said levers when the pad is in position to receive a label from the picker thereby to apply such force to the pad holder, while the latter is at the transfer position, as to assure the spreading of the gum over the entire surface of the label.

18. In a grip-finger assembly for use in a labeling machine of the kind wherein labels are applied to articles while the latter are in motion and wherein the grip-finger assembly moves with the article a predetermined distance while pressing the label against the moving article, said assembly comprising a rigid arm so supported near one end as to rock in a vertical plane, a resilient pad, mounted upon the arm and which is carried, as the arm rocks, from a transfer position, where it takes a gum-coated label from a gum-coated picker, to an affixing position where it contacts the gum-coated surface of the label with the article to be labeled, in combination, a motor device which partakes of the motion of the grip-finger assembly in moving from the transfer position to the affixing position and which is operative to develop force, and force-transmitting levers associated with the pad-supporting arm and which are operative to transmit force from the motor to the pad when the latter is in transfer position and to maintain said force until the pad is separated from the article thereby to assure contact of the entire gum-coated surface of the label with the article.

19. A grip-finger assembly according to claim 18, comprising a second force-transmitting lever associated with the pad-supporting arm and which is operative so to transmit force from the motor to the pad, when the latter is in the transfer position, as to assure contact of the entire surface of the label with the gum-coating on the picker.

References Cited
UNITED STATES PATENTS

| 2,652,941 | 9/1953 | Carter | 156—493X |
| 2,940,630 | 9/1960 | Carter | 156—351 |
| 2,983,398 | 5/1961 | Carter | 156—476X |

JOHN T. GOOLKASIAN, Primary Examiner

G. W. MOXON II, Assistant Examiner

U.S. Cl. X.R.

156—538, 556